US012432504B2

(12) United States Patent
Hersbach et al.

(10) Patent No.: US 12,432,504 B2

(45) Date of Patent: *Sep. 30, 2025

(54) SPATIAL PRE-FILTERING IN HEARING PROSTHESES

(71) Applicant: Cochlear Limited, Macquarie University (AU)

(72) Inventors: Adam Hersbach, Richmond (AU); Richard Bruce Murphy, Auckland (NZ)

(73) Assignee: Cochlear Limited, Macquarie University (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/359,372

(22) Filed: Jul. 26, 2023

(65) Prior Publication Data

US 2023/0370790 A1 Nov. 16, 2023

Related U.S. Application Data

(63) Continuation of application No. 17/261,711, filed as application No. PCT/IB2019/056843 on Aug. 12, 2019, now Pat. No. 11,750,985.

(60) Provisional application No. 62/719,179, filed on Aug. 17, 2018.

(51) Int. Cl.

*H04R 25/00* (2006.01)

*G10L 21/0216* (2013.01)

(52) U.S. Cl.

CPC ........ *H04R 25/505* (2013.01); *G10L 21/0216* (2013.01); *H04R 25/407* (2013.01); *H04R 25/70* (2013.01); *G10L 2021/02165* (2013.01)

(58) Field of Classification Search

None

See application file for complete search history.

(56) References Cited

U.S. PATENT DOCUMENTS

| | | | |
|---|---|---|---|
| 5,550,924 | A | 8/1996 | Helf et al. |
| 8,204,263 | B2 | 6/2012 | Pedersen et al. |
| 8,396,234 | B2 | 3/2013 | Derleth et al. |
| 8,532,307 | B2 | 9/2013 | Derleth et al. |

(Continued)

FOREIGN PATENT DOCUMENTS

| | | | |
|---|---|---|---|
| CN | 105190743 | A | 12/2015 |
| WO | 2016198995 | A1 | 12/2016 |

OTHER PUBLICATIONS

Search Report and the Written Opinion in corresponding International Application No. PCT/IB2019/056843, mailed Jan. 18, 2020, 9 pages.

*Primary Examiner* — Walter F Briney, III

(74) *Attorney, Agent, or Firm* — Edell, Shapiro & Finnan, LLC

(57) ABSTRACT

Presented herein are techniques for increasing sensitivity of a hearing prosthesis to sound signals received from the "side" of a recipient. The sensitivity of the hearing prosthesis to sound signals received from the side of a recipient is provided by a spatial pre-filter that is configured to use a primary reference signal (i.e., a first directional signal) and a side reference signal (i.e., a second directional signal having at least one null directed to the side of the recipient) to calculate a side gain mask. The side gain mask includes gains for each of a plurality of frequency channels associated with the received sound signals.

20 Claims, 11 Drawing Sheets

(56) References Cited

U.S. PATENT DOCUMENTS

| | | | | |
|---|---|---|---|---|
| 8,532,322 | B2 | 9/2013 | Parker | |
| 9,589,580 | B2 | 3/2017 | Hersbach et al. | |
| 9,648,428 | B2 | 5/2017 | Lee et al. | |
| 11,750,985 | B2 * | 9/2023 | Hersbach | G10L 21/0216 381/312 |
| 2010/0124339 | A1 | 5/2010 | Turnbull et al. | |
| 2013/0021503 | A1 | 1/2013 | Zurek et al. | |
| 2015/0230026 | A1 | 8/2015 | Eichfeld et al. | |
| 2016/0366522 | A1 * | 12/2016 | Hillbratt | H04R 25/606 |
| 2017/0148470 | A1 | 5/2017 | Hersbach et al. | |
| 2017/0345439 | A1 * | 11/2017 | Jensen | H04R 25/505 |
| 2019/0122674 | A1 * | 4/2019 | Wang | G10L 19/008 |

* cited by examiner

SPATIAL PRE-FILTERING IN HEARING PROSTHESES

BACKGROUND

Field of the Invention

The present invention relates generally to spatial pre-filtering in hearing prostheses.

Related Art

Hearing loss, which may be due to many different causes, is generally of two types, conductive and/or sensorineural. Conductive hearing loss occurs when the normal mechanical pathways of the outer and/or middle ear are impeded, for example, by damage to the ossicular chain or ear canal. Sensorineural hearing loss occurs when there is damage to the inner ear, or to the nerve pathways from the inner ear to the brain.

Unilateral hearing loss (UHL) or single-sided deafness (SSD) is a specific type of hearing impairment where an individual has one deaf ear and one contralateral functional ear (i.e., one partially deaf, substantially deaf, completely deaf, non-functional and/or absent ear and one functional or substantially functional ear that is at least more functional than the deaf ear). Individuals who suffer from single-sided deafness experience substantial or complete conductive and/or sensorineural hearing loss in their deaf ear.

SUMMARY

In one aspect a method is provided. The method comprises: receiving sound signals with a microphone array of a hearing prosthesis worn on a first side of a head of a recipient; generating, from the received sound signals, a primary reference signal in accordance with a first microphone polar pattern; generating, from the received sound signals, a side reference signal in accordance with a second microphone polar pattern, wherein the second microphone polar pattern is different from the first microphone polar pattern and includes at least one null directed to a spatial region adjacent the first side of the head of the recipient; generating a side gain mask based on the primary reference signal and the side reference signal; and applying the side gain mask to an input signal determined from the sound signals.

In another aspect a hearing prosthesis is provided. The hearing prosthesis is configured to be worn on a first side of a head of a recipient, and comprises: two or more microphones configured to detect sound signals; and a spatial pre-filter configured to: generate a first directional signal from the detected sound signals, generate a second directional from the detected sound signals, wherein the second directional signal is different from the first directional signal and includes at least one null directed to a spatial region adjacent the first side of the head of the recipient, generate a side gain mask based on the first and second directional signals, and apply the side gain mask to an input signal determined from the sound signals to generate a clean sound signal estimate.

BRIEF DESCRIPTION OF THE DRAWINGS

Embodiments of the present invention are described herein in conjunction with the accompanying drawings, in which.

DETAILED DESCRIPTION

Individuals suffering from single-sided deafness have difficulty hearing conversation on their deaf side, localizing sound, and understanding speech in the presence of background noise, such as in cocktail parties, crowded restaurants, etc. For example, the normal two-sided human auditory system is oriented for the use of specific cues that allow for the localization of sounds, sometimes referred to as "spatial hearing." Spatial hearing is one of the more qualitative features of the auditory system that allows humans to identify both near and distant sounds, as well as sounds that occur three hundred and sixty (360) degrees)(°) around the head. However, the presence of one deaf ear and one functional ear, as is the case in single-side deafness, prevents acoustic cues reaching the brain regarding the location of the sound source, thereby resulting in the loss of spatial hearing.

In addition, the "head-shadow effect" causes problems for individuals suffering from single-sided deafness. The head-shadow effect refers to the fact that the deaf ear is in the acoustic shadow of the contralateral functional ear (i.e., on the opposite side of the head). This presents difficulty with speech intelligibility in the presence of background noise, and it is oftentimes the most prevalent when the sound signal source is presented at the deaf ear and the signal has to cross over the head and be heard by the contralateral functional ear.

Figure 1:
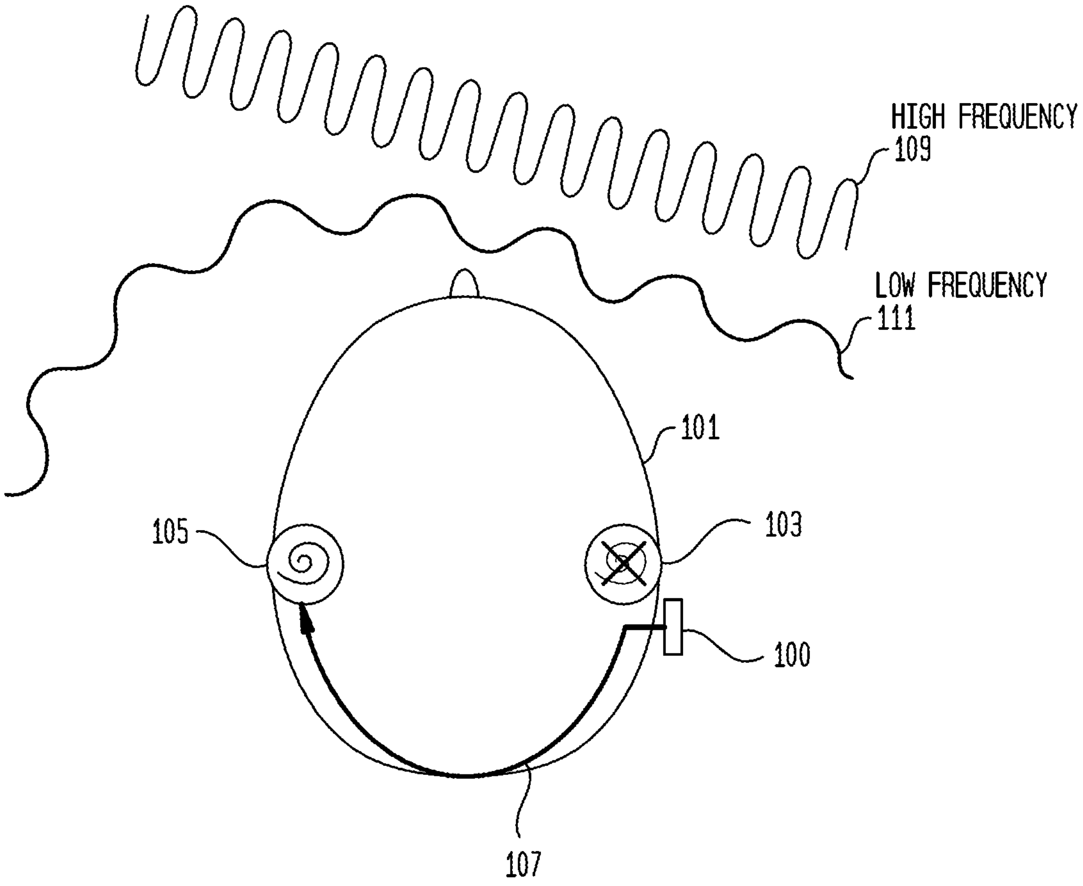
FIG. 1 is a schematic diagram that illustrates the head-shadow effect at the head of an individual suffering from single-sided deafness.

FIG. 1 is a schematic diagram that illustrates the head-shadow effect at the head 101 of an individual suffering from single-sided deafness. As shown, the individual's right ear 103 is deaf (i.e., deaf ear 103) and the contralateral left ear 105 has generally normal audiometric function (i.e., functional ear 105).

FIG. 1 illustrates high frequency sound signals (sounds) 109 and low frequency sounds 111 (with wavelengths not drawn to scale) originating from the deaf side of the head 101 (i.e., the spatial region generally proximate to the deaf ear 105). The low frequency sounds 111, due to their long wavelength, bend readily around the individual's head 101 and, as such, are largely unaffected by the presence of the head. That is, the head 101 is more or less transparent to the functional ear 105 with respect to low frequency sounds originating from the individual's deaf side. However, high frequency sounds 109 have shorter wavelengths and, as such, tend to be reflected by the individual's head 101. As a result, the higher frequencies sounds 109 originating from the deaf side are not well received at the functional ear 105, thereby creating audibility and clarity problems. When considering that consonant sounds, which contain much of the meaning of English speech, generally occur in the higher-frequency domain, the head-shadow effect can be a cause of the difficulty in communication experienced by individuals suffering from single-sided deafness, especially as it relates to speech understanding in the presence of background noise.

In certain examples, frequencies generally above 1.3 kilohertz (kHz) are reflected and are "shadowed" by the recipient's head, while frequencies below 1.3 kHz will bend around the head. Generally speaking, a reason that frequencies below 1.3 kHz are not affected (i.e., bend around the dead) is due to the wave length of such frequencies being in the same order as the width of a normal recipient's head. Therefore, as used herein, "high frequency sounds" or "high frequency sound signals" generally refer to signals having a frequency approximately greater than about 1 kHz to about 1.3 kHz, while "low frequency sounds" or "low frequency sound signals" refer to signals having a frequency approximately less than about 1 kHz to about 1.3 kHz. However, it is to be appreciated that the actual cut-off frequency may be based on a variety of factors, including, but not limited to, the size of a recipient's head.

One treatment for single-sided deafness is the placement of a bone conduction device at an individual's deaf ear. For example, FIG. 1 also schematically illustrates the use of a bone conduction device 100 by the individual suffering from single-sided deafness, sometimes referred to herein as a singled-side deaf recipient or simply recipient. The bone conduction device 100 is located/positioned at the deaf ear 103 and is configured to generate stimulation signals (vibrations) based on received sound signals. As schematically represented by arrow 107, the vibration generate by the bone conduction device 100 propagates through the recipient's skull bone into the cochlea fluids of the functional ear 105, thereby causing the ear hair cells to move and the perception of the received sound signals. In other words, the bone conduction device 100 allows the recipient to hear sounds from his/her deaf side through the use of the contralateral normal ear 105.

Conventional bone conduction devices are typically configured to primarily detect sound originating from in front of a recipient (i.e., a front direction), while adaptively removing sounds originating from other directions/angles. However, due to the presence of a functional ear, an individual suffering from single-sided deafness does not experience significant problems detecting (i.e., picking up) sounds originating from the front direction. Instead, individuals suffering from single-deafness have significant problems with detecting sounds coming from their deaf-side (especially high frequency signals), which are not perceived by the functional ear due to the head shadow effect.

As such, presented herein are techniques for increasing sensitivity of a bone conduction device worn by a recipient, or another type of hearing prosthesis worn by a recipient, to sounds received from the "side" of a recipient. As used herein, the "side" of a recipient is a direction within the spatial region between the "front" of the recipient (i.e., the direction that the recipient is facing at a given time instant) and the "back" of the recipient (i.e., one and hundred (180) degrees from the direction that the recipient is facing at the given time instant). The "front," "back," and "side" refer to directions when the associated hearing prosthesis is worn on the head of the recipient.

The sensitivity of the bone conduction device, or other hearing prosthesis, to sounds received from the side of a recipient is sometimes referred to herein as "side-facing directionality" for the hearing prosthesis. As described further below, the side-facing directionality is provided by a spatial pre-filter that is configured to use a primary reference signal (i.e., a first directional signal) and a side reference signal (i.e., a second directional signal having at least one null directed to the side of the recipient) to calculate a parametric side gain mask, $H_k[n]$, at each time index n, where the side gain, $H_k$, (i.e., the amount of noise reduction) can be applied in each of a plurality of frequency channels (k) associated with the received sound signal. As used herein, frequency channels (k) refer to frequency limited portions of the associated signals (i.e., each frequency channel includes, encompasses, or otherwise covers a specific frequency range).

Before calculation of parametric side gain mask, $H_k[n]$, the primary reference signal and the side reference signal are used to generate instantaneous signal-to-noise ratio (SNR) estimates for a plurality of frequency channels associated with the received sound signal. The calculated instantaneous SNR estimates are used to control the parametric filter (parametric gain function), which generates the parametric side gain mask, $H_k[n]$. The parametric side gain mask, $H_k[n]$, can be applied to an input signal associated with the received sound signal. The input signal may be the un-processed received sound signal or a processed version of the received sound signal, such as the first directional signal. Application of the side gain mask to the input signal generates a clean signal estimate that is used for subsequent sound processing operations (i.e., for generation of stimulation signals for delivery to the recipient of the hearing prosthesis). The clean signal estimate has maximum sensitivity to sounds in the direction of the null of the reference signal used to calculate the instantaneous SNRs.

It is to be appreciated that the side-facing directionality described herein may be implemented in a number of different hearing prostheses (e.g., bone conduction devices, cochlear implants, hearing aids, etc.). These different hearing prostheses may be used to treat single-sided deafness or other hearing impairments. However, merely for ease of illustration, the techniques presented herein are primarily described with reference to the use of bone conduction devices to treat recipients suffering from single-sided deafness. It is to be appreciated that these examples are non-limiting and that techniques presented herein may also be used in a variety of different hearing prostheses.

Figure 2:
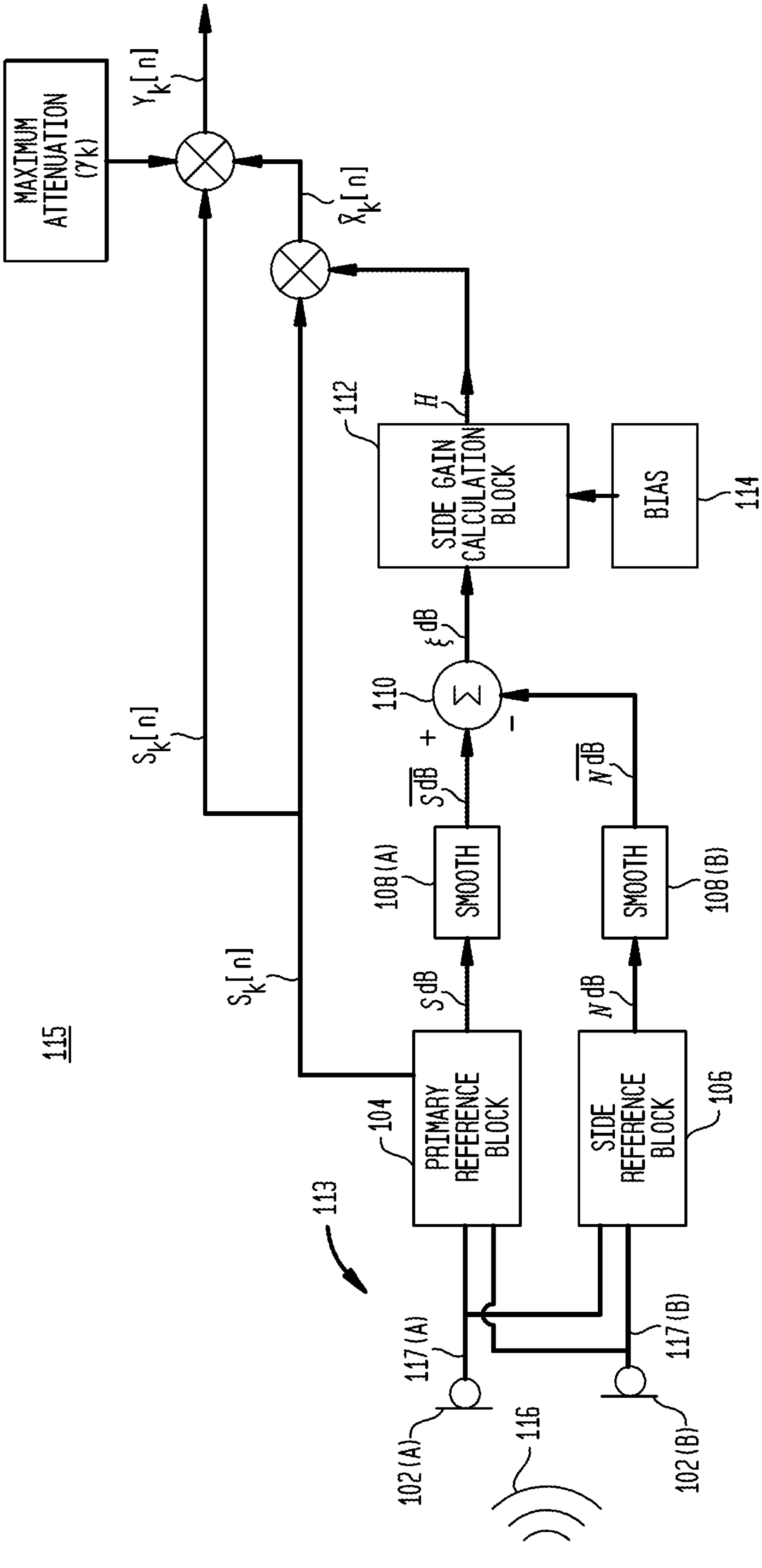
FIG. 2 is a schematic diagram of a spatial pre-filter, in accordance with certain embodiments presented herein.

FIG. 2 is a schematic diagram illustrating techniques for providing a side-facing directionality (i.e., increasing the sensitivity of a hearing prosthesis to sounds received from the side of a recipient), in accordance with certain embodiments presented herein. More specifically, shown in FIG. 2, is a portion/part of bone conduction device 100 configured to be worn on the head of a recipient. The illustrated portion of bone conduction device 100 includes a spatial pre-filter 115, a first microphone 102(A), and a second microphone 102(B). The microphones 102(A) and 102(B) are each configured to detect/receive sound signals (sound) 116 and are configured to convert the received sound signals 116 into electrical signals (microphone signals) 117(A) and 117(B), respectively. The microphones 102(A) and 102(B) collectively illustrative example of a microphone array 113.

The spatial pre-filter 115 of bone conduction device 100 includes a primary reference signal block 104 and a side reference signal block 106. The primary reference signal block 104 is configured to use the microphone signals 117(A) and 117(B) to generate a first directional signal, referred to herein as a primary signal estimate or primary reference signal and denoted as $S_k[n]$. Although not shown in FIG. 2, a short-time Fourier transform (STFT) is used in generation of the primary reference signal, $S_k[n]$, where k is the frequency index and n is the time index of overlapping STFT windows (i.e., the STFT is used to separate the first directional signal into a plurality of frequency channels).

The side reference signal block 106 is configured to use the microphone signals 117(A) and 117(B) to generate a second directional signal, referred to herein as a side signal estimate or side reference signal and denoted as $N_k[n]$. Again, although not shown in FIG. 2, a STFT is used to generate the side reference signal, $N_k[n]$, where k is the frequency index and n is the time index of overlapping STFT windows (i.e., the STFT is used to separate the second directional signal into a plurality of frequency channels).

In certain examples, the primary reference signal and the side reference signal are generated through "delay and subtract" fixed beamformer techniques, or more generally "filter and subtract" or "filter and add" beamformer techniques. However, as described further below, the primary reference signal and the side reference signal may also be generated using adaptive beamformer techniques.

As described further below, the primary reference signal and the side reference signal may have a number of different forms. However, in the techniques presented herein, the side reference signal has a null facing (in the direction of) the side of the recipient. That is, the side reference signal has a null in the in the direction of the spatial region between the front and back directions, relative to the recipient wearing the bone conduction device 100.

The primary reference signal, $S_k[n]$, and the side reference signal, $N_k[n]$, are transformed to the logarithmic (dB) domain, in which the primary reference signal is denoted as $S^{dB}$, and the side reference signal is denoted as $N^{dB}$. As shown in FIG. 2, the primary reference signal and the side reference signal ($S^{dB}$ and $N^{dB}$, respectively, in the dB domain) are filtered separately using respective smoothing filters 108(A) and 108(B). In certain examples, the smoothing filters 108(A) and 108(B) are first-order infinite impulse response (IIR) filters with independent attack (e.g., $0 \le \beta_A \le 1$) and release times (e.g., $0 \le \beta_R \le 1$). Smoothing in the dB domain is used because it relates more closely to perceptual loudness.

Equation 1, below, illustrates the smoothed primary reference signal, given as $\overline{S^{dB}}_k[n]$, at the output of smoothing filter 108(A). Equation 2, below, illustrates the smoothed side reference signal, given, as $\overline{N^{dB}}_k[n]$, at the output of smoothing filter 108(B).

$$\overline{S^{dB}}_k[n] = \beta_S S_k^{dB}[n] + (1-\beta_S)\overline{S^{dB}}_k[n-1], \tag{1}$$

$$\beta_S = \begin{cases} \beta_A, & \overline{S^{dB}}_k[n] > \overline{S^{dB}}_k[n-1] \\ \beta_R, & \text{otherwise} \end{cases}$$

$$\overline{N^{dB}}_k[n] = \beta_N N_k^{dB}[n] + (1-\beta_N)\overline{N^{dB}}_k[n-1], \tag{2}$$

$$\beta_N = \begin{cases} \beta_A, & \overline{N^{dB}}_k[n] > \overline{N^{dB}}_k[n-1] \\ \beta_R, & \text{otherwise} \end{cases}$$

Figure 3:
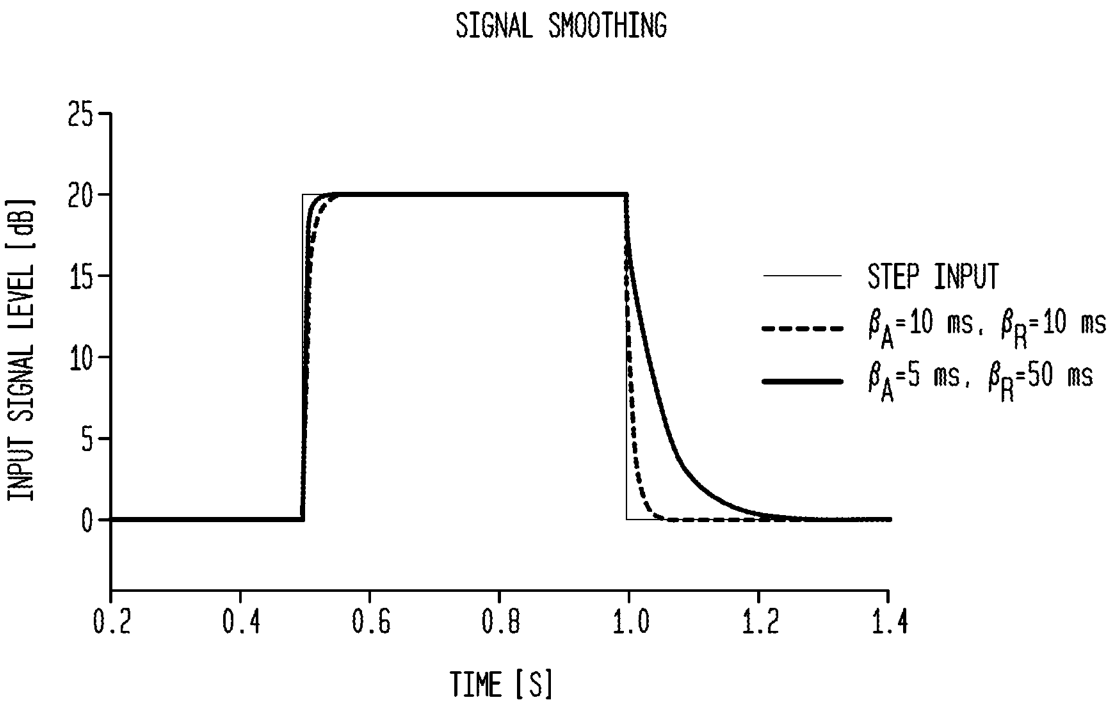
FIG. 3 is a graph illustrating the effect of a signal smoothing operation, in accordance with certain embodiments presented herein.

FIG. 3 is a graph illustrating the effect of the signal smoothing parameter, β, for a step input change in input signal level showing symmetric and asymmetric attack and release time constants.

Returning to the example of FIG. 2, as shown at 112, the smoothed primary reference signal, $\overline{S^{dB}}_k[n]$, and the smoothed side reference signal, $\overline{N^{dB}}_k[n]$, are used to estimate the instantaneous signal-to-noise ratio (SNR), given as $\xi_k[n]$, at each time point, n, and in each frequency band, k. Equation 3, below illustrates the estimation of the instantaneous signal-to-noise ratios in dB.

$$\xi^{dB}_k[n] = \overline{S^{dB}}_k[n] - \overline{N^{dB}}_k[n]. \tag{3}$$

The instantaneous SNR estimate, $\xi_k[n]$, is then used as the primary means to attenuate specific time-frequency channels at side gain calculation block 112. More specifically, in one example, the SNR estimate, $\xi_k[n]$, is used to control a parametric side gain mask (side gain), $H_k[n]$, with adjustable gain threshold (α) 114, which can be configured independently in each frequency band, $\alpha_k > 0$, where the subscript k indicates the frequency independent control of the gain threshold 114. Equation 4, below, illustrates calculation of the parametric side gain mask, $H_k[n]$, in accordance with certain embodiments presented herein.

$$H_k[n] = \frac{\xi_k[n]}{\alpha_k + \xi_k[n]}. \tag{4}$$

Figure 4:
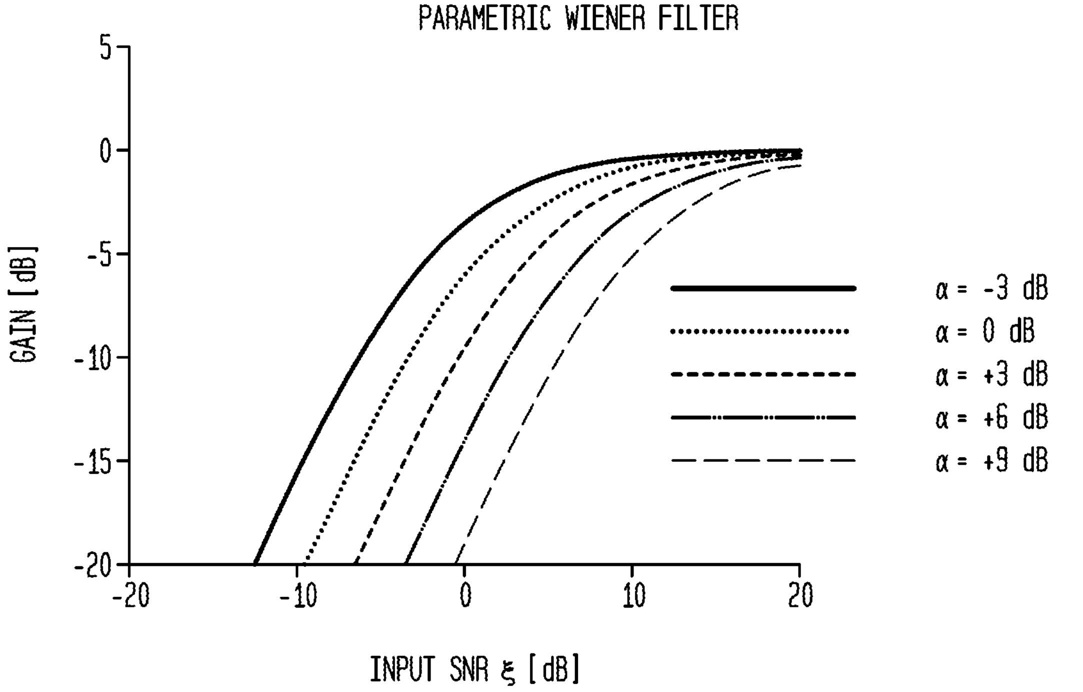
FIG. 4 is a graph illustrating the effect of a bias parameter of a parametric post-filter, for a range of values, in accordance with certain embodiments presented herein.

FIG. 4 illustrates operation of a parametric gain function (e.g., parametric Wiener filter) which maps instantaneous SNR, ξ, to gains. The effect of the gain threshold, α, is shown for a range of values.

Returning to the example of FIG. 2, a clean signal estimate, denoted as $\hat{X}_k[n]$, is estimated by applying the parametric side gain mask, $H_k[n]$, to an input signal. In FIG. 2, the input signal is the primary reference signal $S_k[n]$. Equation 5, below illustrates application of the parametric side gain mask, $H_k[n]$, to the primary signal estimate, $S_k[n]$.

$$\hat{X}_k[n] = H_k[n] S_k[n] \tag{5}$$

Although the above example illustrates the generation of the clean signal estimate, $\hat{X}_k[n]$, by applying the parametric side gain mask, $H_k[n]$, to the primary signal estimate, $S_k[n]$, it is to be appreciated the clean signal estimate could be generated by applying the parametric side gain mask, $H_k[n]$, to other input signals. For example, the parametric side gain mask, $H_k[n]$, could alternatively be applied to one of the unprocessed microphone signals 117(A) or 117(B). As such, as used herein, an input signal can refer to unprocessed microphone signals or processed microphone signals, such as the primary signal estimate, $S_k[n]$.

In the embodiment of FIG. 2, an output signal, $Y_k[n]$, is formed from a weighted combination of the speech reference signal, $S_k[n]$, and the estimated clean signal, $\hat{X}_k[n]$, using a maximum attenuation parameter, $\gamma_k$, which can be configured and applied independently in each frequency band (i.e., the maximum attenuation parameter may be frequency dependent and/or independently configurable in different frequency channels). That is, the maximum attenuation parameter, $\gamma_k$, is used to mix together the estimated clean signal, $\hat{X}_k[n]$, and the speech reference signal, $S_k[n]$. The maximum attenuation parameter may be completely disabled ($\gamma=0$) or completely enable ($\gamma=1$) in the noise reduction processing, with a continuous and smooth transition between the two. The output signal, $Y_k[n]$, is the signal used for further/subsequent processing by the bone conduction device 100. Equation 6, below, illustrates generation of the output signal, $Y_k[n]$, using the maximum attenuation parameter, $\gamma_k$.

$$Y_k[n]=\gamma_k\hat{X}_k[n]+(1-\gamma_k)S_k[n]. \quad (6)$$

In certain examples, the maximum attenuation parameter derives its name from the impact it this value has on the limited gain function that results using an alternative formulation. More specifically, substituting Equation 2-5 into Equation 6 yields Equation 7, shown below, which in turn yield Equation 8, also shown below.

$$Y_k[n]=\gamma_k H_k[n]S_k[n]+(1-\gamma_k])S_k[n] \quad (7)$$

$$Y_k[n]=[\gamma_k H_k[n]+1-\gamma_k]S_k[n] \quad (8)$$

Figure 5:
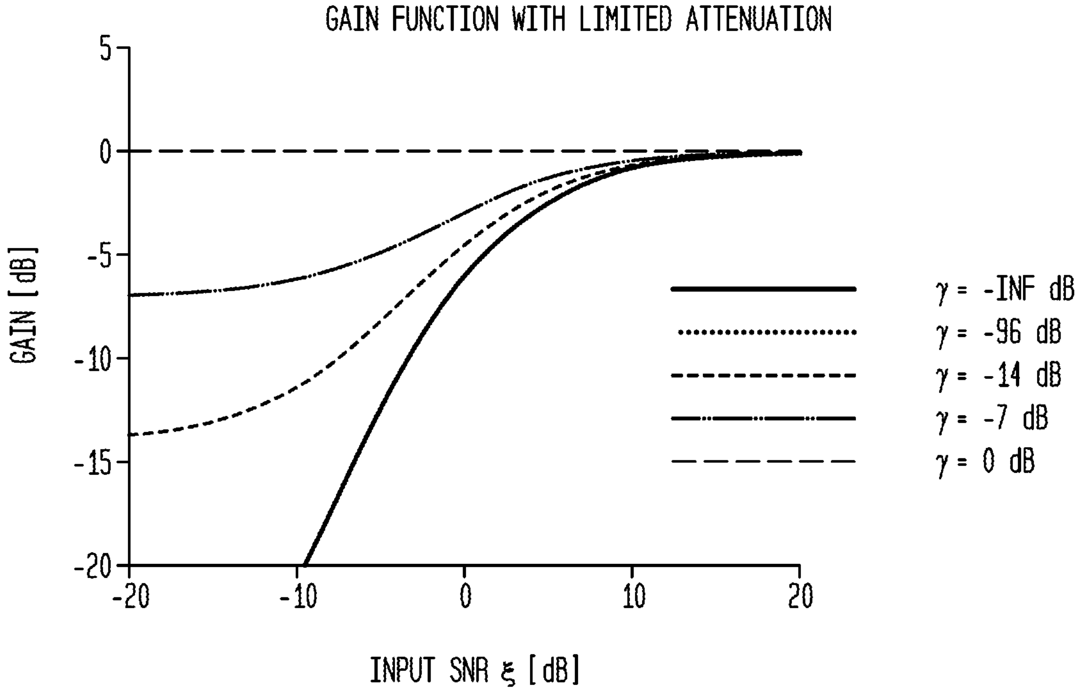
FIG. 5 is a graph illustrating the effect of a maximum attenuation parameter on gain values, in accordance with certain embodiments presented herein.

In Equation 8, the term $\gamma_k H_k[n]+1-\gamma_k$ represents the gain to be applied to the input signal, and when Equation 4 is substituted, as shown below in Equation 9, it represents a gain function with limited attenuation, plotted as shown in FIG. 5. That is, FIG. 5 is a graph illustrating the side gain function ($\alpha$=0 dB) with attenuation that is limited by the maximum attenuation parameter, $$\gamma_k \frac{\xi_k[n]}{\alpha_k + \xi_k[n]} + 1 - \gamma_k \quad (9)$$

That is, FIG. 5 illustrates the effect of a maximum attenuation parameter $\gamma$ on a generated gain mask.

The clean signal estimate, $\hat{X}_k[n]$, has maximum sensitivity to sounds in the direction of the null of the side reference signal, $N_k[n]$, used to calculate the instantaneous SNR. The output signal, $Y_k[n]$, also has the same spatial sensitivity characteristics as found in the clean signal estimate, $\hat{X}_k[n]$, but the output signal is also dependent on the max attenuation parameter. In certain examples, it is possible to set the max attenuation parameter such that no gains are applied in generation of the output signal, $Y_k[n]$. It is also possible to adjust the max attenuation parameter such that the output signal, $Y_k[n]$, is substantially the same as the clean signal estimate, $\hat{X}_k[n]$. The max attenuation provides a means to mix the speech reference signal, $S_k[n]$, and the clean signal estimate, $\hat{X}_k[n]$, in various amounts, to create the output signal, $Y_k[n]$.

As noted above, in the techniques presented herein, including the example of FIG. 2, the side reference signal has a null facing (in the direction of) the side of the recipient (i.e., a null of the side reference signal is oriented between the front and back directions, relative to the recipient wearing the bone conduction device 100). In the techniques presented herein, the null direction of the side reference signal, $N_k[n]$, determines the target direction of clean signal estimate, $\hat{X}_k[n]$, and hence, the output signal, $Y_k[n]$. That is, the null in the side reference signal is used to steer the sensitivity of the spatial pre-filter 115. Therefore, in the examples presented herein, the target direction is to the side of the recipient, thereby providing the side-facing directionality.

An aspect of the techniques presented herein is that the spatial pre-filtering operations of spatial pre-filter 115 operate on channel-by-channel basis, where each frequency channel is processed separately. As such, the applied noise reduction (i.e., the parametric side gain mask, $H_k[n]$,) may be different for different frequency channels.

As noted above, the primary reference signal (primary estimate) and the side reference signal (side estimate) may be generated in a number of different manners. FIGS. 6-9 are schematic diagrams illustrating example implementations for generation of primary reference signals and a side reference signals in accordance with certain embodiments presented herein.

Figure 6:
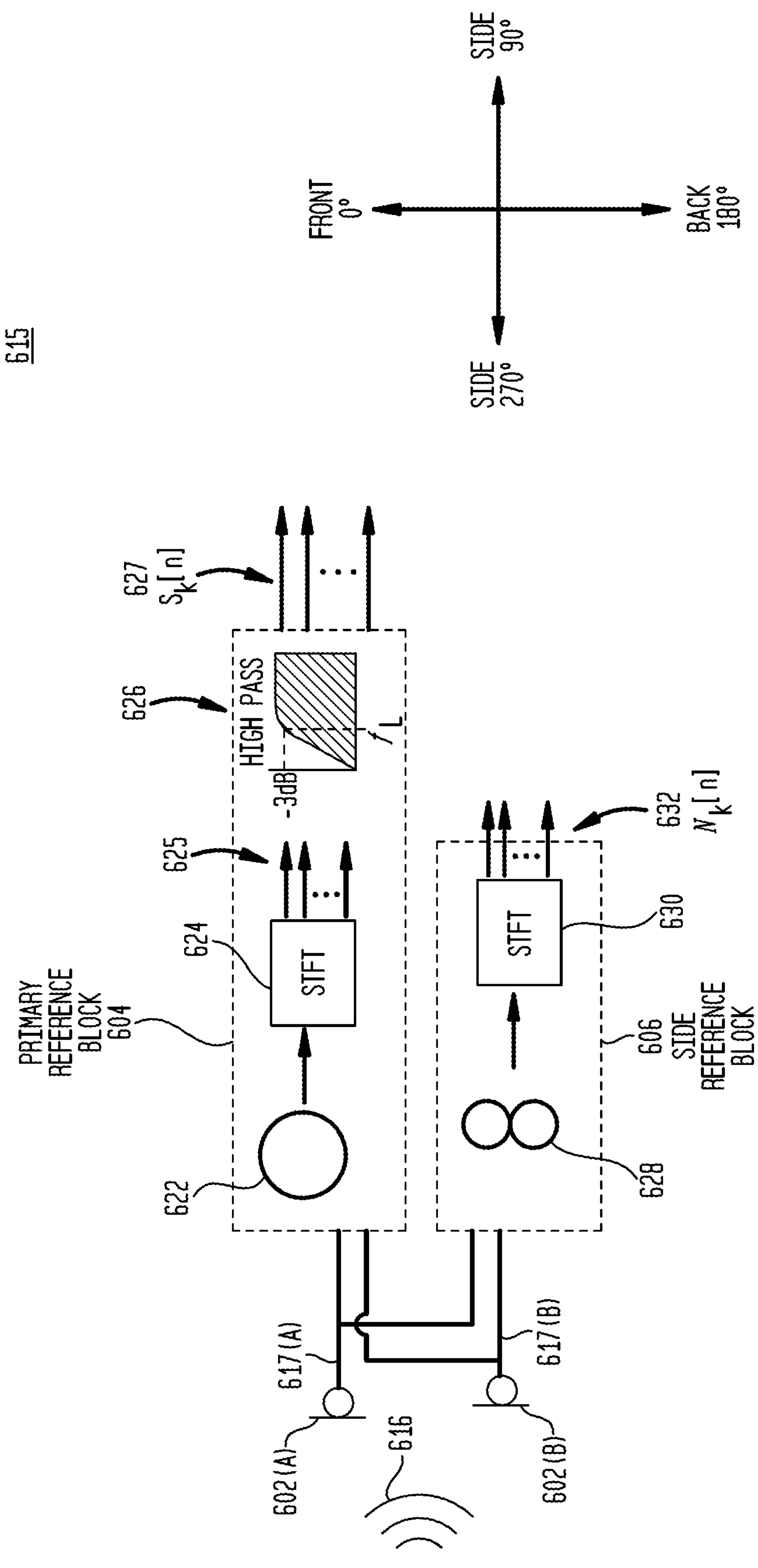
FIG. 6 is a schematic diagram illustrating part of a spatial pre-filter, in accordance with certain embodiments presented herein.

Referring first to FIG. 6, shown is a schematic diagram of a portion of a hearing prosthesis configured to implement the techniques presented herein. The illustrated portion of the hearing prosthesis includes a spatial pre-filter 615, a first microphone 602(A), and a second microphone 602(B). The microphones 602(A) and 602(B) are each configured to detect/receive sound signals (sound) 616 and are configured to convert the received sound signals 616 into electrical signals (microphone signals) 617(A) and 617(B), respectively.

The illustrated portion 615 of the hearing prosthesis also includes a primary reference signal block 604 and a side reference signal block 606. The primary reference signal block 604 is configured to use the microphone signals 617(A) and 617(B) to generate a primary reference signal, $S_k[n]$. In this example, the primary reference signal, $S_k[n]$, is generated from an omnidirectional signal 622 (i.e., a directional signal corresponding to an omnidirectional microphone polar pattern) derived from one or both of the microphone signals 617(A) and 617(B). As shown, a STFT 624 is applied to the omnidirectional signal 622 to segregate the omnidirectional signal into a plurality of frequency channels/components 625. Additionally, generation of the primary reference signal, $S_k[n]$, includes application of a high-pass filter 624 to the frequency channels 625. The high-pass filter 624 is applied to remove frequency channels that are below a threshold frequency, $f_L$. In certain embodiments, the threshold frequency may be approximately 1.3 kHz, since frequencies below 1.3 kHz are not affected by the recipient's head (i.e., bend around the head due to the wave length of such frequencies being in the same order as the width of a normal recipient's head). As such, the primary reference signal, $S_k[n]$, shown in FIG. 6 at 627 is a subset of the frequency channels (i.e., the higher frequency channels above a threshold frequency) of the omnidirectional signal 622.

Also shown in FIG. 6 is a portion of a side reference signal block 606 that is configured to use the microphone signals 617(A) and 617(B) to generate a side reference signal, $N_k[n]$. In this example, the side reference signal, $N_k[n]$, is generated from a figure-of-eight signal 628 (i.e., a directional signal corresponding to a figure-of-eight microphone polar pattern) derived from microphone signals 617(A) and 617(B). In the example of FIG. 6, when the hearing prosthesis is worn on the head of the recipient, the nulls in the figure-of-eight microphone polar pattern are oriented/directed towards the side of the recipient. In the example shown in FIG. 6, the nulls in the figure-of-eight microphone polar pattern are each oriented approximately ninety (90) degrees from the front of the recipient, although other null orientations are possible.

Also as shown in FIG. 6, a STFT 630 is applied to the figure-of-eight signal 628 to segregate the figure-of-eight signal into a plurality of frequency channels/components 632. The plurality of frequency channels 632 form the side reference signal, $N_k[n]$.

In summary, FIG. 6 illustrates an example in which the primary reference signal, $S_k[n]$, is generated from sound signals captured with an omnidirectional microphone polar pattern, while the side reference signal, $N_k[n]$, is generated from sound signals captured with a figure-of-eight microphone polar pattern, resulting in $S^{dB}$ and $N^{dB}$, respectively, after conversion to the log domain. As noted, the instantaneous SNR, $\xi^{dB}$, is then estimated from the difference of the smoothed primary reference signal and side reference signal, which in turn was used to calculate the noise reduction gains (e.g., using a parametric gain function). The instantaneous SNR, in dB, is calculated as the difference of the signals, while in linear units the instantaneous SNR may be calculated as the ratio of the signals. In the embodiment of FIG. 6, the nulls of the side reference signal, $N_k[n]$, (i.e., the nulls in the figure-of-eight microphone polar pattern) dictate the sensitivity of the hearing prosthesis (i.e., the null direction of the side reference signal, $N_k[n]$, determines the target direction of the output signal, $Y_k[n]$)). This means that the hearing prosthesis will be most sensitive to sounds that are received from the spatial areas/directions to which the nulls are directed, while attenuating sounds received from other directions. Therefore, in the example of FIG. 6, the target direction (area of sensitivity for the hearing prosthesis) is to the side of the recipient, particularly approximately 90 degrees to the side of the recipient. As noted elsewhere herein, references to the "front," "back," and "side" refer to directions when the associated hearing prosthesis is worn on the head of the recipient.

It is to be appreciated that FIG. 6 illustrates an idealized (free-field) omnidirectional microphone polar pattern and an idealized (free-field) figure-of-eight microphone polar pattern (e.g., patterns while not in proximity to a recipient's head). However, as noted above, the hearing prosthesis is worn on the head of the recipient and, in practice, the omnidirectional microphone polar pattern and the figure-of-eight microphone polar pattern will be affected by the presence of the recipient's head adjacent to the microphones. For example, the hearing prosthesis (and thus the microphones 617(A) and 617(B)) may be positioned on, for example, the right side of the recipient's head. In this example, the microphone polar patterns for the right half (i.e., between 0 and 180 degrees) will look similar to the idealized patterns shown in FIG. 6, but the left half (i.e., between 180 and 0 degrees) will look quite different. In particular, the omnidirectional microphone polar pattern and the figure-of-eight microphone polar pattern will, in practice, each, have reduced sensitivity to the spatial regions on the left (opposite) side of the head. The result of this example is that the right half of the omnidirectional microphone polar pattern and the figure-of-eight pattern will look similar to each other. This is an advantage for single-sided deafness (and potentially other) applications in that the processed output signal will contain only a left facing spatial pattern. That is, the techniques presented herein primarily increase sensitivity to sounds received on the same side of the head as which the hearing prosthesis is located/worn. This is in contrast to ideal free field conditions with no head, when the output would actually be bi-directional (left and right) which is not desirable for a single-sided deafness application.

Figure 7:
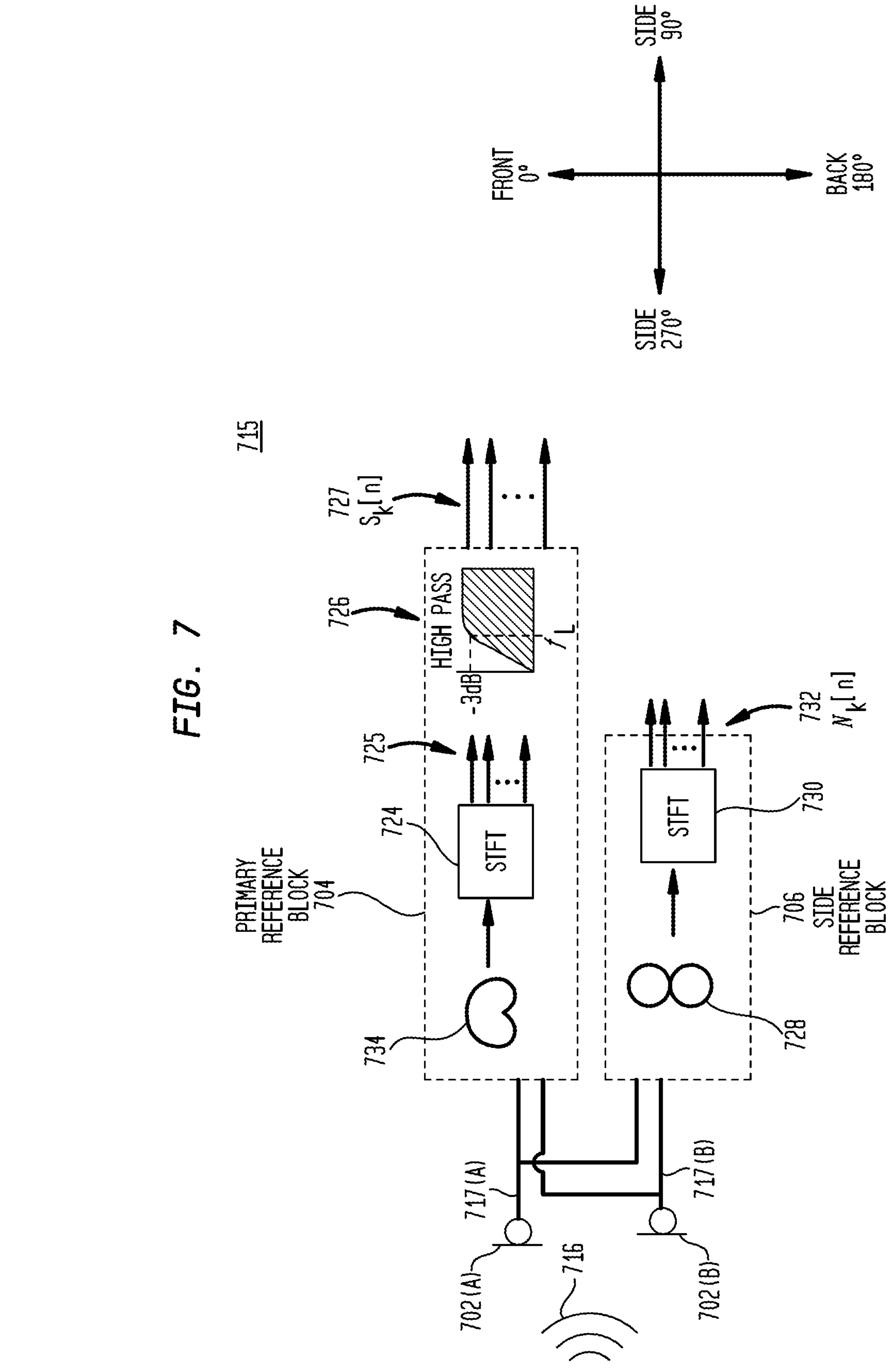
FIG. 7 is a schematic diagram illustrating part of a spatial pre-filter, in accordance with certain embodiments presented herein.

Referring next to FIG. 7, shown is a schematic diagram of a portion of a hearing prosthesis configured to implement the techniques presented herein. The illustrated portion of the hearing prosthesis includes a spatial pre-filter 715, a first microphone 702(A), and a second microphone 702(B). The microphones 702(A) and 702(B) are each configured to detect/receive sound signals (sound) 716 and are configured to convert the received sound signals 716 into electrical signals (microphone signals) 717(A) and 717(B), respectively.

The illustrated portion 715 of the hearing prosthesis also includes a primary reference signal block 704 and a side reference signal block 706. The primary reference signal block 704 is configured to use the microphone signals 717(A) and 717(B) to generate a primary reference signal, $S_k[n]$. In this example, the primary reference signal, $S_k[n]$, is generated from a front facing cardioid signal 734 (i.e., a directional signal corresponding to a front facing cardioid microphone polar pattern) derived from microphone signals 717(A) and 717(B). As shown, a STFT 724 is applied to the front facing cardioid signal 734 to segregate the front facing cardioid signal into a plurality of frequency channels/components 725. Additionally, generation of the primary reference signal, $S_k[n]$, includes application of a high-pass filter 724 to the frequency channels 725. The high-pass filter 724 is applied to remove frequency channels that are below a threshold frequency, $f_L$. In certain embodiments, the threshold frequency may be approximately 1.3 kHz. As such, the primary reference signal, $S_k[n]$, shown in FIG. 7 at 727 is a subset of the frequency channels (i.e., the higher frequency channels above a threshold frequency) of the front facing cardioid signal 724.

Also shown in FIG. 7 is a portion of a side reference signal block 706 that is configured to use the microphone signals 717(A) and 717(B) to generate a side reference signal, $N_k[n]$. In this example, the side reference signal, $N_k[n]$, is generated from a figure-of-eight signal 728 (i.e., a directional signal corresponding to a figure-of-eight microphone polar pattern) derived from microphone signals 717(A) and 717(B). In the example of FIG. 7, when the hearing prosthesis is worn on the head of the recipient, the nulls in the figure-of-eight microphone polar pattern are oriented/directed towards the side of the recipient. In the example shown in FIG. 7, the nulls in the figure-of-eight microphone polar pattern are each oriented approximately ninety (90) degrees from the front of the recipient, although other null orientations are possible.

Also as shown in FIG. 7, an STFT 730 is applied to the figure-of-eight signal 728 to segregate the figure-of-eight signal into a plurality of frequency channels/components 732. The plurality of frequency channels 732 form the side reference signal, $N_k[n]$.

In summary, FIG. 7 illustrates an example in which the primary reference signal, $S_k[n]$, is generated from sound signals captured with a front facing cardioid microphone polar pattern, while the side reference signal, $N_k[n]$, is generated from sound signals captured with a figure-of-eight microphone polar pattern, resulting in $S^{dB}$ and $N^{dB}$, respectively, after conversion to the log domain. As noted, the instantaneous SNR, $\xi^{dB}$, is then estimated from the difference of the smoothed primary reference signal and side reference signal, which in turn was used to calculate the noise reduction gains (e.g., using a parametric gain function). In the embodiment of FIG. 7, the nulls of the side reference signal, $N_k[n]$, (i.e., the nulls in the figure-of-eight microphone polar pattern) dictate the sensitivity of the hearing prosthesis (i.e., the null direction of the side reference signal, $N_k[n]$, determines the target direction of the output signal, $Y_k[n]$)). This means that the hearing prosthesis will be most sensitive to sounds that are received from the spatial areas/directions to which the nulls are directed, while attenuating sounds received from other directions. Therefore, in the example of FIG. 7, the target direction (area of sensitivity for the hearing prosthesis) is to the side of the recipient, particularly approximately 90 degrees to the side of the recipient. As noted elsewhere herein, references to the "front," "back," and "side" refer to directions when the associated hearing prosthesis is worn on the head of the recipient.

It is to be appreciated that FIG. 7 illustrates an idealized (free-field) front facing cardioid microphone polar pattern and an idealized (free-field) figure-of-eight microphone polar pattern. However, as noted above, the hearing prosthesis is worn on the head of the recipient and, in practice, the front facing cardioid microphone polar pattern and the figure-of-eight microphone polar pattern will be affected by the presence of the recipient's head adjacent to the microphones. For example, the front facing cardioid microphone polar pattern and the figure-of-eight microphone polar pattern may, in practice, each, have reduced sensitivity to the spatial regions on the opposite side of the head. Therefore, the techniques presented herein primarily increase sensitivity to sounds received on the same side of the head as which the hearing prosthesis is located.

Figure 8:
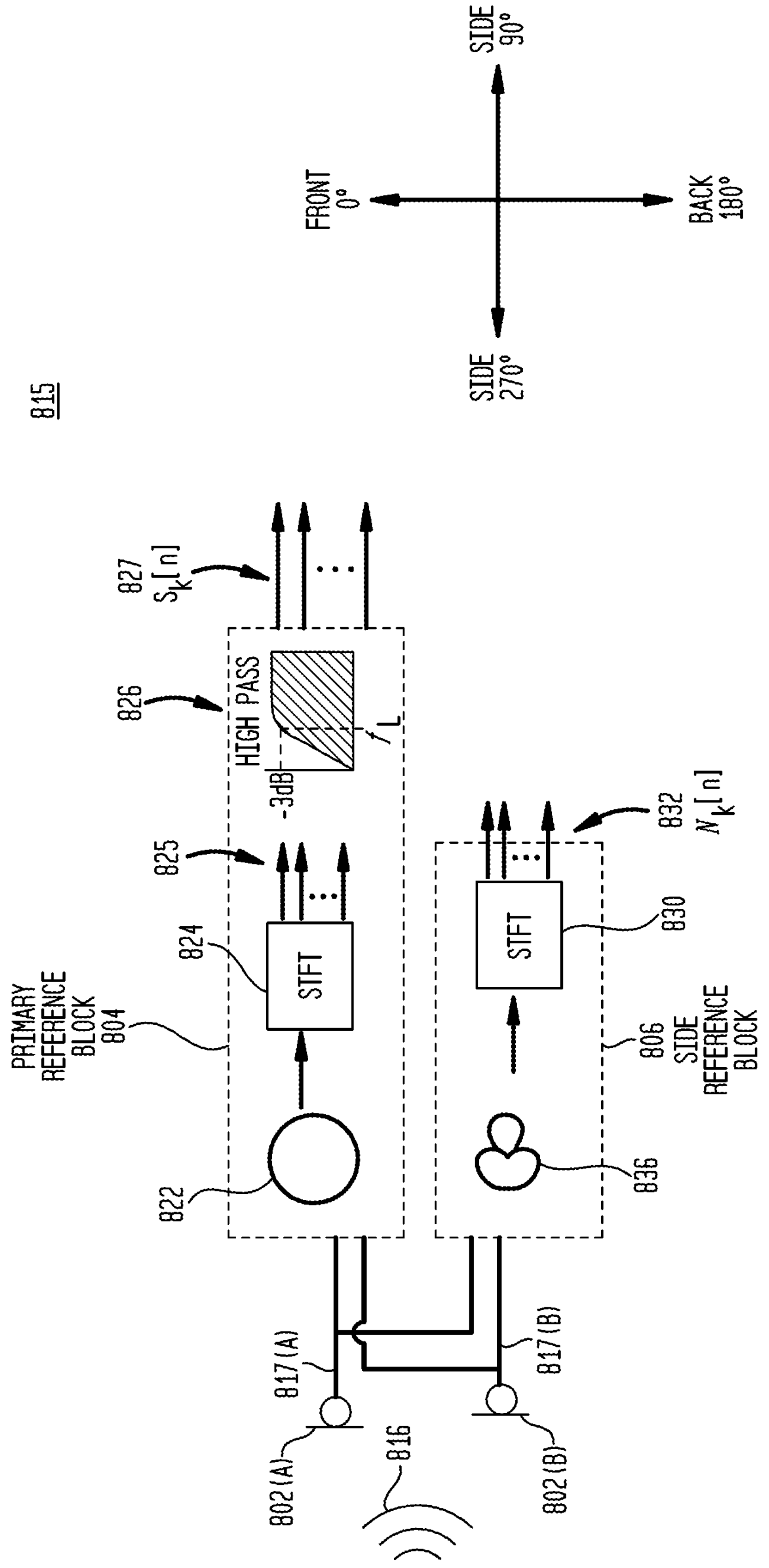
FIG. 8 is a schematic diagram illustrating part of a spatial pre-filter, in accordance with certain embodiments presented herein.

Referring next to FIG. 8, shown is a schematic diagram of a portion of a hearing prosthesis configured to implement the techniques presented herein. The illustrated portion of the hearing prosthesis includes a spatial pre-filter 815, a first microphone 802(A), and a second microphone 802(B). The microphones 802(A) and 802(B) are each configured to detect/receive sound signals (sound) 816 and are configured to convert the received sound signals 816 into electrical signals (microphone signals) 817(A) and 817(B), respectively.

The illustrated portion 815 of the hearing prosthesis also includes a primary reference signal block 804 and a side reference signal block 806. The primary reference signal block 804 is configured to use the microphone signals 817(A) and 817(B) to generate a primary reference signal, $S_k[n]$. In this example, the primary reference signal, $S_k[n]$, is generated from an omnidirectional signal 822 (i.e., a directional signal corresponding to an omnidirectional microphone polar pattern) derived from microphone signals 817(A) and 817(B). As shown, a STFT 824 is applied to the omnidirectional signal 822 to segregate the omnidirectional signal into a plurality of frequency channels/components 825. Additionally, generation of the primary reference signal, $S_k[n]$, includes application of a high-pass filter 824 to the frequency channels 825. The high-pass filter 824 is applied to remove frequency channels that are below a threshold frequency, $f_L$. In certain embodiments, the threshold frequency may be approximately 1.3 kHz, since frequencies below 1.3 kHz. As such, the primary reference signal, $S_k[n]$, shown in FIG. 8 at 827 is a subset of the frequency channels (i.e., the higher frequency channels above a threshold frequency) of the omnidirectional signal 822.

Also shown in FIG. 8 is a portion of a side reference signal block 806 that is configured to use the microphone signals 817(A) and 817(B) to generate a side reference signal, $N_k[n]$. In this example, the side reference signal, $N_k[n]$, is generated from a hypercardoid signal 836 (i.e., a directional signal corresponding to a hypercardoid microphone polar pattern) derived from microphone signals 817(A) and 817(B). In the example of FIG. 8, when the hearing prosthesis is worn on the head of the recipient, the nulls in the hypercardoid pattern are oriented/directed towards the side of the recipient. In particular, hypercardoid pattern of FIG. 8 includes two nulls, where the first null is oriented approximately forty-five (45) degrees from the front of the recipient and the second null is oriented approximately one hundred thirty-five (135) degrees from the front of the recipient.

Also as shown in FIG. 8, a STFT 830 is applied to the hypercardoid signal 836 to segregate the hypercardoid signal 836 into a plurality of frequency channels/components 832. The plurality of frequency channels 832 form the side reference signal, $N_k[n]$.

In summary, FIG. 8 illustrates an example in which the primary reference signal, $S_k[n]$, is generated from sound signals captured with an omnidirectional microphone polar pattern, while the side reference signal, $N_k[n]$, is generated from sound signals captured with a hypercardoid microphone polar pattern, resulting in $S^{dB}$ and $N^{dB}$, respectively, after conversion to the log domain. As noted, the instantaneous SNR, $\xi^{dB}$, is then estimated from the difference of the smoothed primary reference signal and side reference signal, which in turn was used to calculate the noise reduction gains (e.g., using a parametric gain function). In the embodiment of FIG. 8, the nulls of the side reference signal, $N_k[n]$, (i.e., the nulls in the hypercardoid microphone polar pattern) dictate the sensitivity of the hearing prosthesis (i.e., the null direction of the side reference signal, $N_k[n]$, determines the target direction of the output signal, $Y_k[n]$)). This means that the hearing prosthesis will be most sensitive to sounds that are received from the spatial areas/directions to which the nulls are directed, while attenuating sounds received from other directions. Therefore, in the example of FIG. 8, the target direction (area of sensitivity for the hearing prosthesis) is to the side of the recipient, particularly approximately 45 and 135 degrees to the side of the recipient. As noted elsewhere herein, references to the "front," "back," and "side" refer to directions when the associated hearing prosthesis is worn on the head of the recipient.

It is to be appreciated that FIG. 8 illustrates an idealized (free-field) omnidirectional microphone polar pattern and an idealized (free-field) hypercardoid microphone polar pattern. However, as noted above, the hearing prosthesis is worn on the head of the recipient and, in practice, the omnidirectional microphone polar pattern and the hypercardoid microphone polar pattern will be affected by the presence of the recipient's head adjacent to the microphones. For example, the omnidirectional microphone polar pattern and the hypercardoid microphone polar pattern may, in practice, each, have reduced sensitivity to the spatial regions on the opposite side of the head. Therefore, the techniques presented herein primarily increase sensitivity to sounds received on the same side of the head as which the hearing prosthesis is located/worn.

Figure 9:
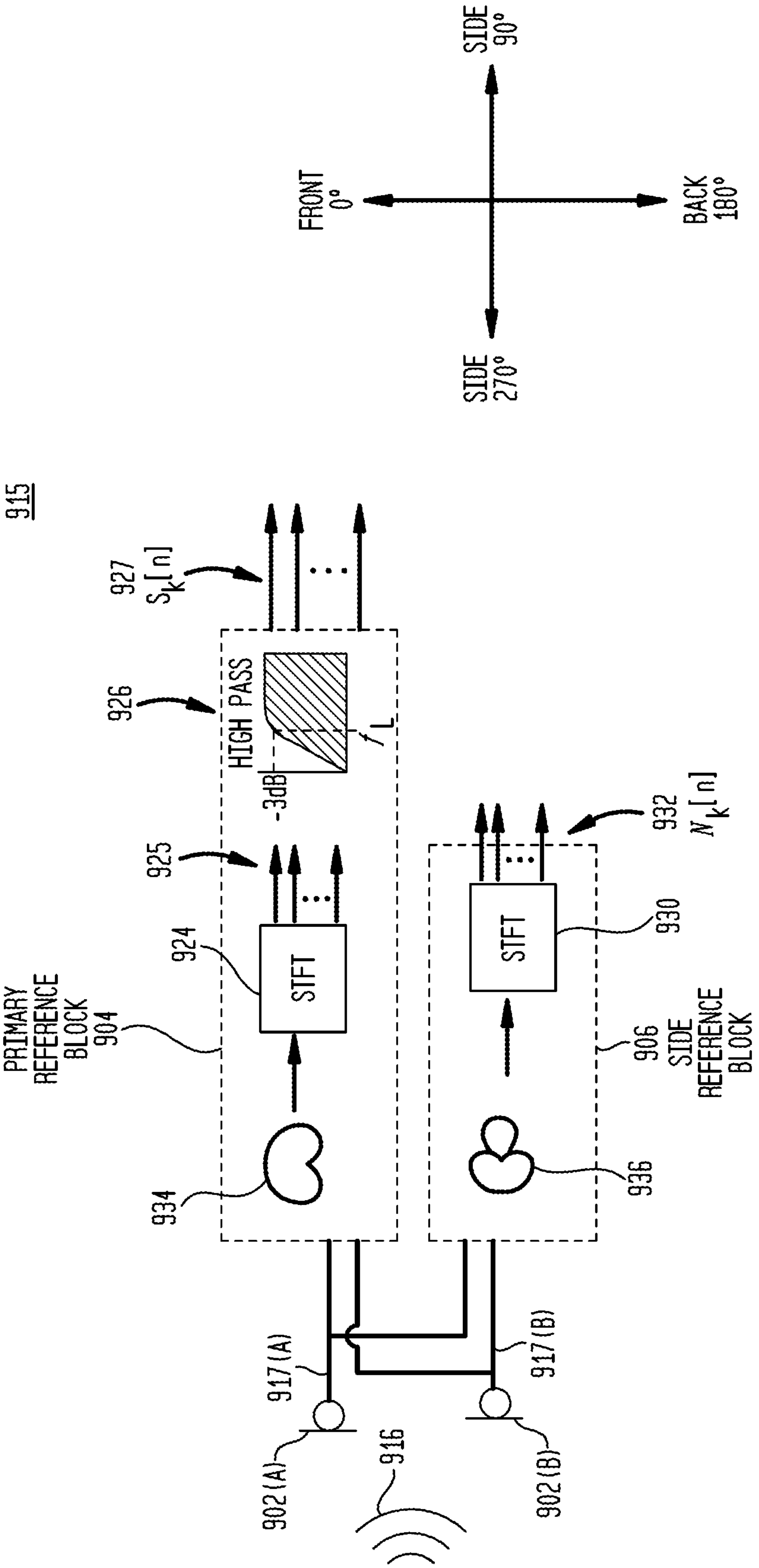
FIG. 9 is a schematic diagram illustrating part of a spatial pre-filter, in accordance with certain embodiments presented herein.

Referring next to FIG. 9, shown is a schematic diagram of a portion of a hearing prosthesis configured to implement the techniques presented herein. The illustrated portion of the hearing prosthesis includes a spatial pre-filter 915, a first microphone 902(A), and a second microphone 902(B). The microphones 902(A) and 902(B) are each configured to detect/receive sound signals (sound) 916 and are configured to convert the received sound signals 916 into electrical signals (microphone signals) 917(A) and 917(B), respectively.

The illustrated portion 915 of the hearing prosthesis also includes a primary reference signal block 904 and a side reference signal block 906. The primary reference signal block 904 is configured to use the microphone signals 917(A) and 917(B) to generate a primary reference signal, $S_k[n]$. In this example, the primary reference signal, $S_k[n]$, is generated from a front facing cardioid signal 934 (i.e., a directional signal corresponding to a front facing cardioid microphone polar pattern) derived from microphone signals 917(A) and 917(B). As shown, an STFT 924 is applied to the front facing cardioid signal 934 to segregate the front facing cardioid signal into a plurality of frequency channels/components 925. Additionally, generation of the primary reference signal, $S_k[n]$, includes application of a high-pass filter 924 to the frequency channels 925. The high-pass filter 924 is applied to remove frequency channels that are below a threshold frequency, $f_L$. In certain embodiments, the threshold frequency may be approximately 1.3 kHz, since frequencies below 1.3 kHz. As such, the primary reference signal, $S_k[n]$, shown in FIG. 9 at 927 is a subset of the frequency channels (i.e., the higher frequency channels above a threshold frequency) of the front facing cardioid signal 934.

Also shown in FIG. 9 is a portion of a side reference signal block 906 that is configured to use the microphone signals 917(A) and 917(B) to generate a side reference signal, $N_k[n]$. In this example, the side reference signal, $N_k[n]$, is generated from a hypercardoid signal 936 (i.e., a directional signal corresponding to a hypercardoid microphone polar pattern) derived from microphone signals 917(A) and 917(B). In the example of FIG. 9, when the hearing prosthesis is worn on the head of the recipient, the nulls in the hypercardoid pattern are oriented/directed towards the side of the recipient. In particular, hypercardoid pattern of FIG. 9 includes two nulls, where the first null is oriented approximately forty-five (45) degrees from the front of the recipient and the second null is oriented approximately one hundred thirty-five (135) degrees from the front of the recipient.

Also as shown in FIG. 9, an STFT 930 is applied to the hypercardoid signal 936 to segregate the hypercardoid signal 936 into a plurality of frequency channels/components 932. The plurality of frequency channels 932 form the side reference signal, $N_k[n]$.

In summary, FIG. 9 illustrates an example in which the primary reference signal, $S_k[n]$, is generated from sound signals captured with a front facing cardioid microphone polar pattern, while the side reference signal, $N_k[n]$, is generated from sound signals captured with a hypercardoid microphone polar pattern, resulting in $S^{dB}$ and $N^{dB}$, respectively, after conversion to the log domain. As noted, the instantaneous SNR, $\xi^{dB}$, is then estimated from the difference of the smoothed primary reference signal and side reference signal, which in turn was used to calculate the noise reduction gains (e.g., using a parametric gain function). In the embodiment of FIG. 9, the nulls of the side reference signal, $N_k[n]$, (i.e., the nulls in the hypercardoid microphone polar pattern) dictate the sensitivity of the hearing prosthesis (i.e., the null direction of the side reference signal, $N_k[n]$, determines the target direction of the output signal, $Y_k[n]$)). This means that the hearing prosthesis will be most sensitive to sounds that are received from the spatial areas/directions to which the nulls are directed, while attenuating sounds received from other directions. Therefore, in the example of FIG. 9, the target direction (area of sensitivity for the hearing prosthesis) is to the side of the recipient, particularly approximately 45 and 135 degrees to the side of the recipient. As noted elsewhere herein, references to the "front," "back," and "side" refer to directions when the associated hearing prosthesis is worn on the head of the recipient.

It is to be appreciated that FIG. 9 illustrates an idealized (free-field) front facing cardioid microphone polar pattern and an idealized (free-field) hypercardoid microphone polar pattern. However, as noted above, the hearing prosthesis is worn on the head of the recipient and, in practice, the front facing cardioid microphone polar pattern and the hypercardoid microphone polar pattern will be affected by the presence of the recipient's head adjacent to the microphones. For example, the front facing cardioid microphone polar pattern and the hypercardoid microphone polar pattern may, in practice, each, have reduced sensitivity to the spatial regions on the opposite side of the head. Therefore, the techniques presented herein primarily increase sensitivity to sounds received on the same side of the head as which the hearing prosthesis is located/worn.

As noted above, FIGS. 6-9 are schematic diagrams illustrating example implementations for generation of primary reference signals and a side reference signals in accordance with certain embodiments presented herein. In these examples, the primary reference signals and a side reference signals are primary fixed directional pattern (e.g., fixed beamforming). However, in alternative embodiments, the side reference signal may be "steered" using, for example, adaptive beamforming techniques. In general, such an approach makes estimate of the direction of the likely target signal based on a signal analysis, then steer the null in the estimated direction. The estimated direction could be determined in a number of different manners.

As described elsewhere herein, it is to be appreciated that the optimal "null" direction for the side reference signal may not be directly to the side of a recipient (i.e., not directly at 90 degrees), but potentially somewhere between 0 degrees and 90 degrees. In such examples, the null angle of the side-reference signal is adjusted, either manually or through some automatic control.

As noted above, FIGS. 6-9 illustrate embodiments in which the primary reference signal blocks include a high-pass filter to remove low frequency channels in generation of the primary reference signal, $S_k[n]$. It is to be appreciated that the use of a high-pass filter is illustrative and that other techniques may be used to remove the low frequency channels.

Removal of the low frequency channels may be particularly advantageous with bone conduction devices used for single-sided deafness. As noted above, bone conduction devices used for single-sided deafness are positioned at the recipient's deaf ear and the vibration is transferred through the skull to the recipient's functional ear. The long wavelength of low frequency sounds enable these sounds to bend readily around the recipient's head. As a result, the low frequency channels processed at a bone conduction device may include sounds that have bent around the recipient's head and have already been received by the recipient's functional ear. In these examples, removal of the low frequency channels prevents these low frequency sounds from being presented to the recipient twice It is also to be appreciated that removal of the low frequency channels in generation of the primary reference signal, $S_k[n]$ is optional and that the high-pass filter, or other frequency removal technique, may be omitted in certain embodiments. That is, in certain embodiments, the primary reference signal, $S_k[n]$, may include all frequency channels. More specifically, the high-pass filter has been shown as an example technique to control which frequencies are processed in the noise reduction stage. However, as noted above, the techniques presented herein are able to process each frequency band individually, and control parameters exist for these purpose. Therefore, instead of introducing the high-pass filter, it may be possible to control the processing within each frequency band using the provided control parameters. For example, the gain threshold parameter, a, described above may be used to effectively control the beam width, and the maximum attenuation parameter, also described above, may be used to control the degree of attenuation applied to the noisy segments (and can be adjusted to provide little or no noise reduction, if desired). For example, the max attenuation parameter is frequency dependent and be used to control the noise reduction across frequency.

Figure 10:
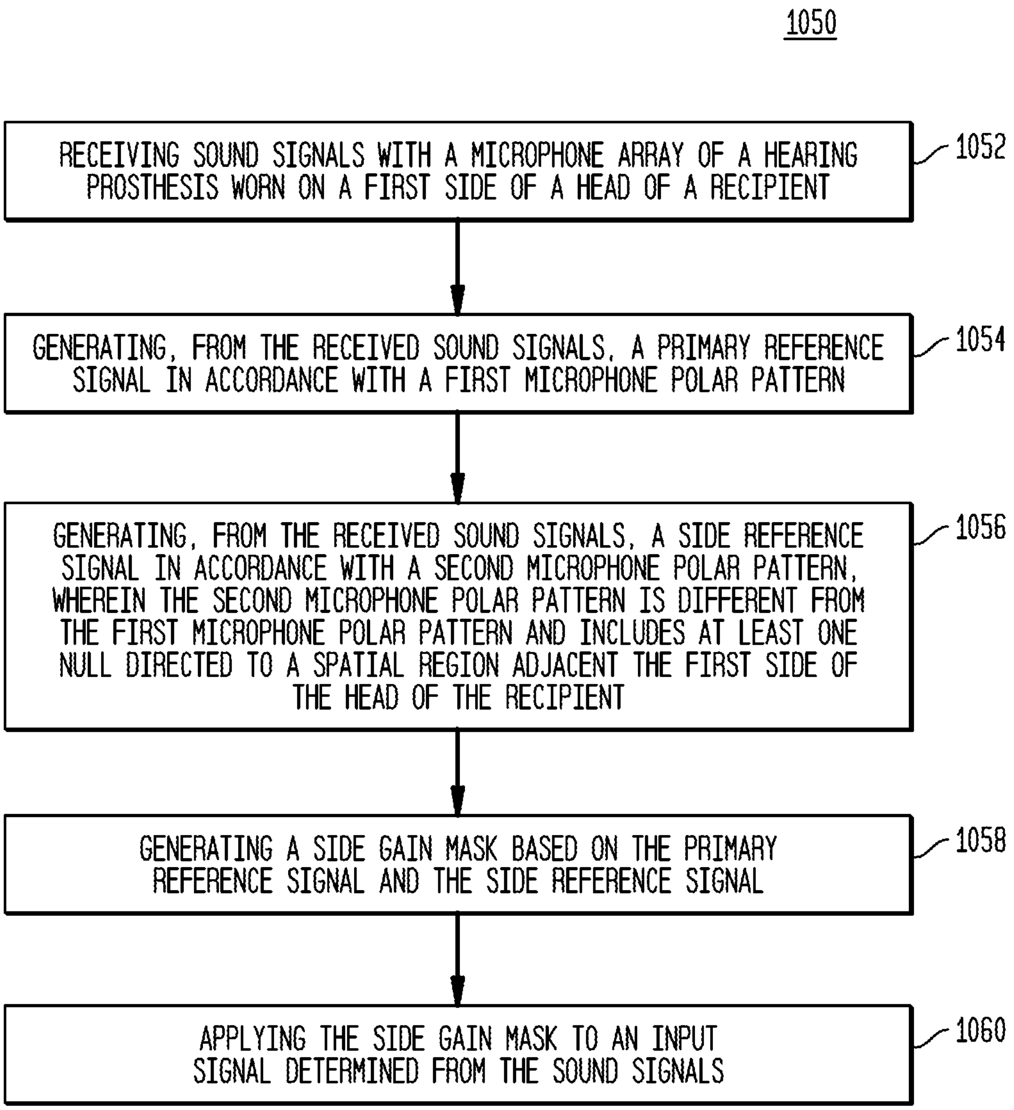
FIG. 10 is a flowchart of a method, in accordance with certain embodiments presented herein.

FIG. 10 is a flowchart of a method 1050 in accordance with certain embodiments presented herein. Method 1050 begins at 1052 where a microphone array 113 (i.e., two or more microphones) of a hearing prosthesis receives sound signals. The hearing prosthesis is worn on a first side of a head of a recipient of the hearing prosthesis. At 1054, a primary reference signal is generated from the received sound signals, in accordance with a first microphone polar pattern. At 1056, a side reference signal is generated from the received sound signals, in accordance with a second microphone polar pattern. The second microphone polar pattern is different from the first microphone polar pattern and includes at least one null directed to a spatial region adjacent the first side of the head of the recipient.

At 1058, a side gain mask is generated based on the primary reference signal and the side reference signal. At 1060, the side gain mask is applied to an input signal determined from the sound signals. In one example, the input signal determined from the sound signals is the primary reference signal.

In certain embodiments, generating the side gain mask includes determining, from the primary reference signal and the side reference signal, instantaneous signal-to-noise ratios at a plurality of frequency channels associated with the primary reference signal and the side reference signal. The instantaneous signal-to-noise ratios can then be used in a parametric gain function to calculate a parametric gain mask comprising a plurality of gains each associated with one of the plurality of frequency channels associated with the primary reference signal and the side reference It is to be appreciated that, as described elsewhere herein, the primary reference signal and the side reference signal are each separated into frequency channels (e.g., a STFT is performed on a directional signal generated in accordance with the associated microphone pattern). As such, the signal-to-noise ratios are calculated in each of a plurality of frequency bands associated with the primary reference signal and/or the side reference signal. The resulting plurality of signal-to-noise ratios, each corresponding to an associated frequency band (i.e., the frequency band portions of the primary reference signal and the side reference signal used to generate that signal-to-noise ratio) is parameter that is used in the gain function to side gain mask with independent control of the resulting side directional gain in that specific frequency band. Stated differently, the techniques presented herein operate on a channel-by-channel basis, where each frequency channel is processed separately and can have an independently controllable side direction gain that is generated and applied to the specific frequency channel.

In certain embodiments, the estimated signal-to-noise ratios or gains at one frequency band can be used as the signal-to-noise ratio or gain in another frequency band. For example, in certain embodiments, there is little or no spatial information available for certain frequency bands (e.g., low frequency bands). In such an example, the techniques presented herein may use the calculated signal-to-noise ratios or gains determined from the high frequencies to apply gains to the lower frequencies (e.g., adjust the low frequencies based on signal-to-noise ratio(s) calculated at the higher frequencies). The effect is to enhance the low frequencies based on the information from the higher frequencies.

In certain embodiments, low frequency attenuation may be performed by finding the average SNR for a range of frequencies above a threshold/cutoff frequency, and using that as the SNR for frequencies below the cutoff (i.e., the low frequency channels get the mean or average of the high frequency channels). The averaging may be performed in the SNR domain (as opposed to Gain) since averaging is in dB (as opposed to linear gain). The averaging may include unequal weighting from the contributing frequency bands.

In one illustrative example, it may be possible to start using the 1 kHz band (or the lowest frequency that is believed to provide spatial information) and to use that gain (or SNR) for all of the bands below that frequency. In this case, Gain and SNR would result in equivalent performance, and in most cases will be interchangeable. This example may be extended where, for example, the low frequency bands have a local gain (calculated within the frequency band), and high frequency gain calculated at or about 1 kHz. Rather than directly substituting the high frequency gain for the local gain, it may be advantageous to have a parameter that allows them to be mixed together. The format for mixing would be identical to the max attenuation stage described above with reference to FIG. 2, which enables the mixing of signals under parameter control. In this case, the two gain signals are mixed under parameter control, which can be specified at each of the low frequency bands. The reason for controlling the mixing is to allow frequencies closer to the 1 kHz band to receive more influence from the 1 kHz band, and lower frequencies to receive less influence, and rely more on their local gain, which is likely configured to apply very little noise reduction. This arrangement provides the opportunity to have a type of sliding scale adjustment which may be advantageous over a discrete cutoff frequency. The transition from low to high frequency about the cutoff is gradual.

Additionally, as described above, a high frequency band gain may be based on one or more frequency bands. In one such arrangement, an average of the gains can be computed (e.g., in dB units), and the weighting may be unequal. The unequal weighting may be used so that the system can place more emphasis on the channels that have better spatial information. That is, more weighting could be given to the higher frequencies within the group. There is also a case for taking the maximum (or minimum) gain from the group, which would have the effect of being conservative (maximum) or aggressive (minimum) in terms of noise reduction applied to the lower bands.

Figure 11:
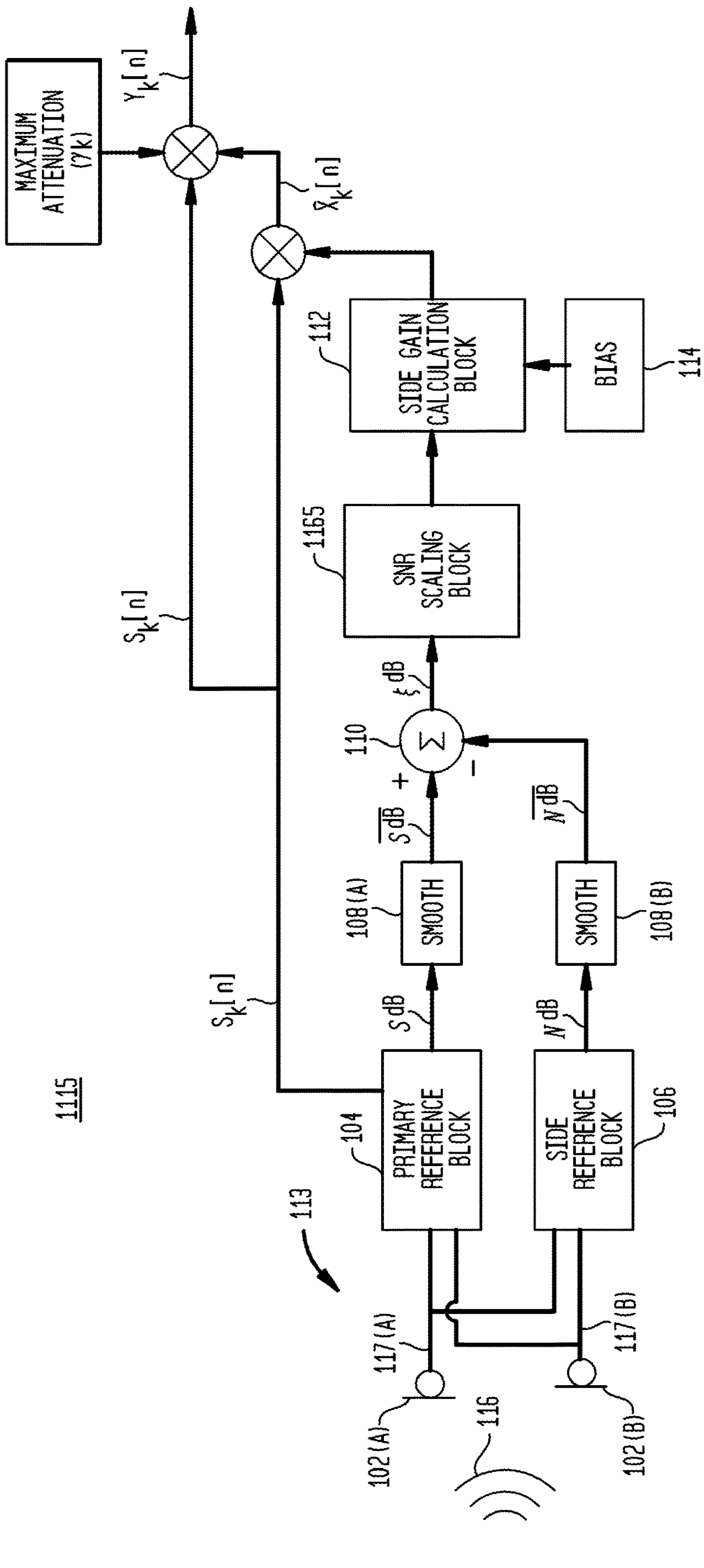
FIG. 11 is a schematic diagram of a spatial pre-filter that includes a signal-to-noise ratio (SNR) scaling block, in accordance with certain embodiments presented herein.

In certain embodiments, signal-to-noise (SNR)-scaling may be applied to the signal-to-noise ratios is calculated in each frequency band. FIG. 11 is a schematic block diagram of a bone conduction device 1100 configured to perform such SNR-scaling operations.

More specifically, bone conduction device 1100 includes microphones 102(A) and 102(B) and a spatial pre-filter 1115 that is substantially similar to spatial pre-filter 115 of FIG. 2. However, in this example, spatial pre-filter 1115 additionally includes an SNR scaling block 1165 configured to scale the SNR estimate, $\xi_k[n]$, before the SNR estimate is used to control the parametric gain function (side gain), $H_k[n]$. The scaled SNR estimate is referred to as $\xi_k{}^a[n]$. The SNR scaling operations applied at the SNR scaling block 1165 to generate $\xi_k{}^a[n]$ are given as shown below in Equation 10.

$$\xi_k^a[n] = \xi^{min} + \frac{\xi_k[n] - \xi_k^{Front}}{\xi_k^{Side} - \xi_k^{Front}}\left(\xi^{max} - \xi^{min}\right) \tag{10}$$

Where:

$\xi_k[n]$ is the instantaneous SNR at each time point n and in each frequency band k calculated from the combination of the primary reference signal and the side reference signal;

- $\xi^{max}$ and $\xi^{min}$ the maximum and minimum SNRs, respectively, (in dB, broadband) to which the instantaneous SNR is to be remapped, which, in turn, define the minimum and maximum gain of the subsequent parametric Wiener gain mask;
- $\xi_k{}^{Front}$ is the calculated SNR for a signal from the front direction in each frequency band (e.g., a signal is played from the front direction and the SNR that is calculated is extracted); and
- $\xi_k{}^{Side}$ is the calculated SNR for a signal from the side direction in each frequency band (e.g., a signal is played from the front direction and the SNR that is calculated is extracted).

In certain embodiments, the values for $\xi_k{}^{Front}$, $\xi_k{}^{Side}$, $\xi^{max}$, and $\xi^{min}$ are all pre-determined/pre-programmed values during, for example, a clinical fitting session in which the hearing prosthesis is "fit" or "customized" for the specific recipient. In certain embodiments, $\xi^{max}$ and $\xi^{min}$ can be standardized and correlated to how much noise reduction is desired. For example, the $\xi^{max}$ and $\xi^{min}$ can be set to +20 dB and −20 dB, respectively, +10 dB and −10 dB, respectively, or other values.

The SNR scaling block 1165 is configured to normalize the instantaneous SNR with the knowledge of what the SNR is during detection of front sound signals only and what the SNR is during detection of side sounds only. Equation 10 normalizes the SNR of the input signals detected by the microphones 102(A) and 102(B) between the $\xi^{max}$ and $\xi^{min}$ which are fixed parameters, while taking into account the SNR of the front input and the SNR of side input. The output of the SNR scaling block 1165 is adjusted SNR estimates for each of the k frequency bands. That is, the SNR scaling block 1165 is that, for a given input SNR, the noise reduction gain that is calculated is similar across frequency. The microphone dependent variation across frequency is thus removed (or reduced) by the SNR-normalization stage.

Figure 12:
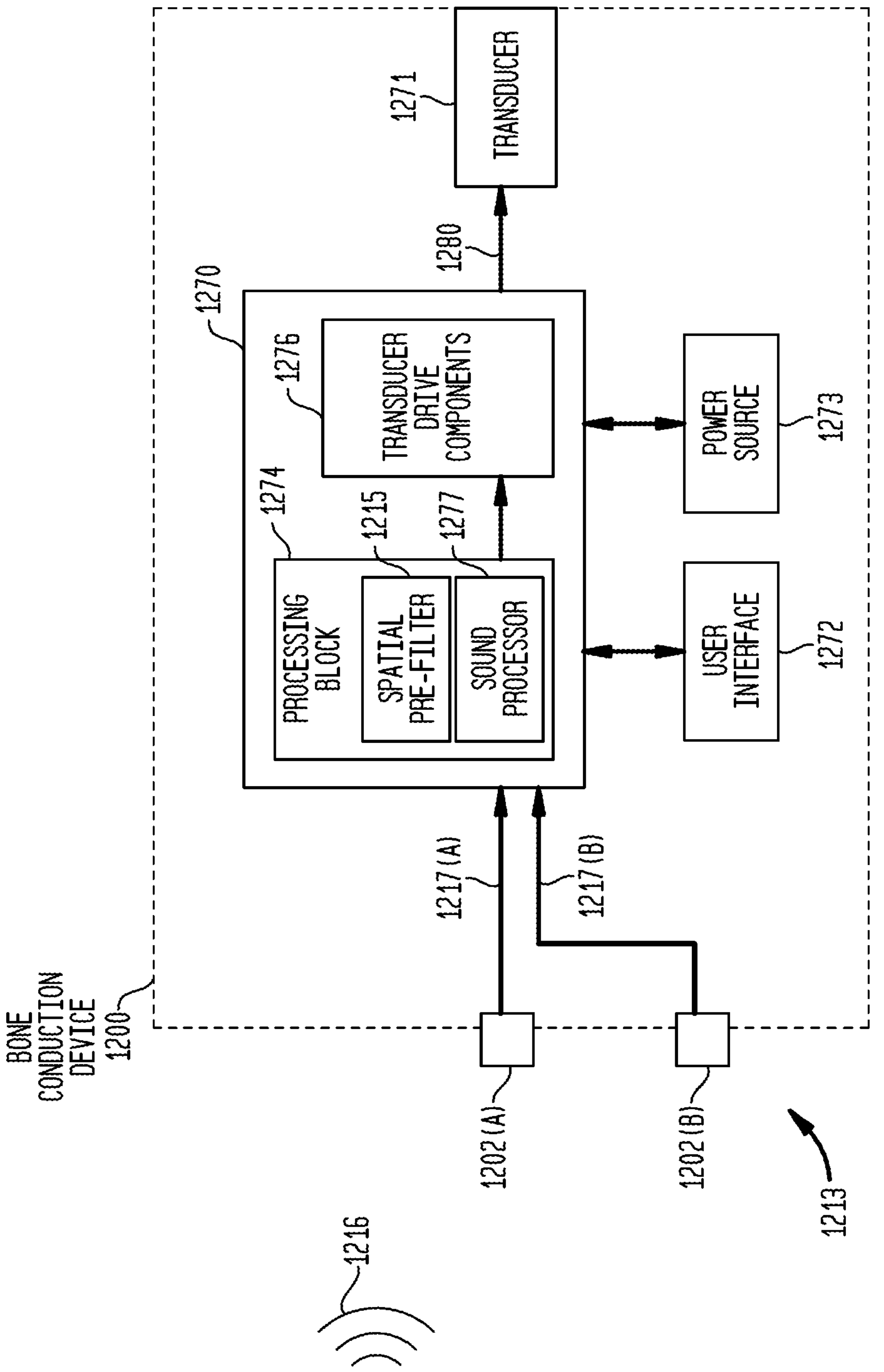
FIG. 12 is a block diagram of a bone conduction device that includes a spatial pre-filter, in accordance with embodiments presented herein.

FIG. 12 is a functional block diagram of one example arrangement for a bone conduction device 1200 in accordance with embodiments presented herein. Bone conduction device 1200 is configured to be positioned at (e.g., behind) a recipient's ear. The bone conduction device 1200 comprises a microphone array 1213, an electronics module 1270, a transducer 1271, a user interface 1272, and a power source 1273.

The microphone array 1213 comprises microphones 1202(A) and 1202(B) that are configured to convert received sound signals 1216 into microphone signals 1217(A) and 1217(B). Although not shown in FIG. 12, bone conduction device 1200 may also comprise other sound inputs, such as ports, telecoils, etc.

The microphone signals 1217(A) and 1217(B) are provided to electronics module 1270 for further processing. In general, electronics module 1270 is configured to convert the microphone signals 1217(A) and 1217(B) into one or more transducer drive signals 1280 that active transducer 1271. More specifically, electronics module 1270 includes, among other elements, a processing block 1274 and transducer drive components 1276.

The processing block 1274 comprises a number of elements, including a spatial pre-filter 1215 and a sound processor 1277. Each of the spatial pre-filter 1215 and the sound processor 1277 may be formed by one or more processors (e.g., one or more Digital Signal Processors (DSPs), one or more uC cores, etc.), firmware, software, etc. arranged to perform operations described herein. That is, the spatial pre-filter 1215 and the sound processor 1277 may each be implemented as firmware elements, partially or fully implemented with digital logic gates in one or more application-specific integrated circuits (ASICs), partially or fully in software, etc.

As described elsewhere herein, the spatial pre-filter 1215 is configured to generate an output signal, $Y_k[n]$, having sensitivity to the side of the recipient (e.g., perform operations as described above with reference to pre-filters 115, 615, 715, 815, 915, 1115). The sound processor 1277 is configured to further process the output signal, $Y_k[n]$, for use by the transducer drive components 1276. That is, the sound processor configured to use the output signal, $Y_k[n]$, to generate stimulation signals (vibrations) for delivery to a recipient of the bone conduction device.

Transducer 1271 illustrates an example of a stimulation unit that receives the transducer drive signal(s) 1280 and generates vibrations for delivery to the skull of the recipient via a transcutaneous or percutaneous anchor system (not shown) that is coupled to bone conduction device 1200. Delivery of the vibration causes motion of the cochlea fluid in the recipient's contralateral functional ear, thereby activating the hair cells in the functional ear.

FIG. 12 also illustrates the power source 1273 that provides electrical power to one or more components of bone conduction device 1300. Power source 1273 may comprise, for example, one or more batteries. For ease of illustration, power source 1273 has been shown connected only to user interface 1272 and electronics module 1270. However, it should be appreciated that power source 1273 may be used to supply power to any electrically powered circuits/components of bone conduction device 1200.

User interface 1272 allows the recipient to interact with bone conduction device 1200. For example, user interface 1272 may allow the recipient to adjust the volume, alter the speech processing strategies, power on/off the device, etc. Although not shown in FIG. 12, bone conduction device 1200 may further include an external interface that may be used to connect electronics module 1270 to an external device, such as a fitting system.

As noted, presented herein are techniques for increasing the sensitivity of a bone conduction device, or other hearing prosthesis, to sounds received from the side of a recipient (i.e., providing "side-facing directionality" for the hearing prosthesis). Also as described above, the side-facing directionality is provided by a spatial pre-filter that is configured to calculate instantaneous signal-to-noise ratios (SNRs) across a plurality of frequency channels of a sound signal received at a microphone array of the hearing prosthesis. The instantaneous SNRs are calculated from first and second directional signals derived from the received sound signal (i.e., the first and second directional signals are generated in accordance with first and second microphone polar patterns, respectively, applied to the sound signal). In the accordance with embodiments presented herein, the second directional signal (second microphone polar pattern) has a null directed to the side of the recipient. The calculated instantaneous SNRs are then used to control a parametric filter (parametric gain function), which generates side-directional gains for different frequency channels of the received sound signal. Collectively, the side-directional gains may be referred to as a "side-gain mask," which can be applied to an input signal associated with the received sound signal. The input signal may be the un-processed received sound signal or a processed version of the received sound signal, such as the first directional signal. Application of the side-gain mask to the input signal generates a clean signal estimate that is used for subsequent sound processing operations. The clean signal estimate has maximum sensitivity to sounds in the direction of the null of the second directional signal used to calculate the instantaneous SNRs.

As noted above, certain aspects of the techniques presented herein may be applied in bone conduction devices used to treat single-sided deafness. The techniques presented herein improve spatial discrimination for single-sided deafness and may avoid unnecessary acoustic (bone conduction) simulation. The techniques presented herein may reduce power consumption and improve perception of sound originating on the deaf side.

For ease of illustration, the techniques presented herein are primarily described with reference to the use of bone conduction devices to treat recipients suffering from single-sided deafness. However, as noted, the side-facing directionality described herein may be implemented in a number of other types of hearing prostheses, including cochlear implants (e.g., cochlear implant button processors), hearing aids, etc., used to treat single-sided deafness or other hearing impairments. Therefore, it is to be appreciated that the description of the techniques presented herein with reference to bone conduction devices is merely illustrative.

The invention described and claimed herein is not to be limited in scope by the specific preferred embodiments herein disclosed, since these embodiments are intended as illustrations, and not limitations, of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A method, comprising:

receiving sound signals with a microphone array of a hearing device worn on a first side of a head of a recipient, wherein the sound signals comprise a plurality of frequency channels;

generating, from the received sound signals, a primary reference signal in accordance with a first microphone polar pattern;

generating, from the received sound signals, a side reference signal in accordance with a second microphone polar pattern, wherein the second microphone polar pattern is different from the first microphone polar pattern and includes at least one null;

generating a side gain mask based on the primary reference signal and the side reference signal for the plurality of frequency channels;

applying, at the hearing device worn on the first side of the head of the recipient, the side gain mask to an input signal determined from the sound signals, wherein applying the side gain mask to the input signal comprises applying the side gain mask associated with a first frequency channel of the plurality of frequency channels to a second frequency channel of the input signal, wherein the second frequency channel is not included in the plurality of frequency channels;

generating, at the hearing device worn on the first side of the head of the recipient, a clean sound signal estimate from the applying of the side gain mask to the input signal; and using the clean sound signal estimate to generate stimulation signals for delivery to an ear on a second side of the head of the recipient.

2. The method of claim 1, wherein generating the side gain mask comprises:

determining, from the primary reference signal and the side reference signal, instantaneous signal-to-noise ratios at the plurality of frequency channels; and using the instantaneous signal-to-noise ratios in a parametric gain function to calculate a parametric gain mask comprising a plurality of gains each associated with one of the plurality of frequency channels associated with the primary reference signal and the side reference signal.

3. The method of claim 2, wherein the plurality of gains of the parametric gain mask are each associated with one of the plurality of frequency channels of the input signal, and wherein the method comprises:

applying a gain associated with a first frequency channel of the input signal to a second frequency channel of the input signal, wherein the second frequency channel includes a frequency range that is different than a frequency range covered by the first frequency channel.

4. The method of claim 2, further comprising scaling one or more of the instantaneous signal-to-noise ratios prior to using the instantaneous signal-to-noise ratios in the parametric gain function.

5. The method of claim 1, wherein generating the primary reference signal in accordance with a first microphone polar pattern comprises generating the primary reference signal in accordance with an omnidirectional microphone polar pattern.

6. The method of claim 1, wherein generating the primary reference signal in accordance with a first microphone polar pattern comprises generating the primary reference signal in accordance with a front-facing cardioid microphone polar pattern having maximum sensitivity to sounds received from a spatial region at a front of the head of the recipient.

7. The method of claim 1, wherein generating the side reference signal in accordance with a second microphone polar pattern comprises generating the side reference signal in accordance with a figure-of-eight microphone polar pattern, wherein at least one null of the figure-of-eight microphone polar pattern is directed to a spatial region adjacent the first side of the head of the recipient.

8. The method of claim 1, wherein generating the side reference signal in accordance with a second microphone polar pattern comprises generating the side reference signal in accordance with a hypercardoid microphone polar pattern, wherein at least one null of the hypercardoid microphone polar pattern is directed to a spatial region adjacent the first side of the head of the recipient.

9. The method of claim 1, wherein generating the side gain mask based on the primary reference signal and the side reference signal comprises generating the side gain mask to increase sensitivity to sound that does not bend around the head of the recipient.

10. The method of claim 1, wherein generating the side gain mask based on the primary reference signal and the side reference signal comprises generating the side gain mask to increase sensitivity to sound frequencies at or above 1.3 kHz.

11. A method, comprising:

receiving sound signals with a microphone array of a hearing device worn on a first side of a head of a recipient, wherein the sound signals comprise a plurality of frequency channels;

generating, from the received sound signals, a primary reference signal in accordance with a first microphone polar pattern;

generating, from the received sound signals, a side reference signal in accordance with a second microphone polar pattern, wherein the second microphone polar pattern is different from the first microphone polar pattern and includes at least one null for sound frequencies at or above 1.3 kHz in a spatial region adjacent the first side of the head of the recipient;

generating a side gain mask based on the primary reference signal and the side reference signal configured to increase sensitivity to the sound frequencies at or above 1.3 kHz;

applying, at the hearing device worn on the first side of the head, the side gain mask to an input signal determined from the sound signals, wherein applying the side gain mask to the input signal comprises applying the side gain mask associated with a first frequency channel of the plurality of frequency channels to a second frequency channel of the input signal, wherein the second frequency channel is not included in the plurality of frequency channels;

generating, at the hearing device worn on the first side of the head of the recipient, a clean sound signal estimate from the applying of the side gain mask to the input signal; and using the clean sound signal estimate to generate stimulation signals for delivery to an ear on a second side of the head of the recipient.

12. The method of claim 11, wherein generating the primary reference signal in accordance with a first microphone polar pattern comprises generating the primary reference signal in accordance with an omnidirectional microphone polar pattern.

13. The method of claim 11, wherein generating the primary reference signal in accordance with a first microphone polar pattern comprises generating the primary reference signal in accordance with a front-facing cardioid microphone polar pattern having maximum sensitivity to sounds received from a spatial region at a front of the head of the recipient.

14. The method of claim 11, wherein generating the side reference signal in accordance with a second microphone polar pattern comprises generating the side reference signal in accordance with a microphone polar pattern comprising at least one null directed to a spatial region adjacent the first side of the head of the recipient.

15. A hearing device configured to be worn on a first side of a head of a recipient, comprising:

two or more microphones configured to detect sound signals; and one or more processors configured to:

generate, from the sound signals, a primary reference signal in accordance with a first microphone polar pattern, wherein the sound signals comprise a plurality of frequency channels;

generate, from the sound signals, a side reference signal in accordance with a second microphone polar pattern, wherein the second microphone polar pattern is different from the first microphone polar pattern and includes at least one null;

generate a side gain mask based on the primary reference signal and the side reference signal for the plurality of frequency channels;

apply, at the hearing device worn on the first side of the head, the side gain mask to an input signal determined from the sound signals, wherein applying the side gain mask to the input signal comprises applying the side gain mask associated with a first frequency channel of the plurality of frequency channels to a second frequency channel of the input signal, wherein the second frequency channel is not included in the plurality of frequency channels;

generate, at the hearing device worn on the first side of the head of the recipient, a clean sound signal estimate from the applying of the side gain mask to the input signal; and use the clean sound signal estimate to generate stimulation signals for delivery to an ear on a second side of the head of the recipient.

16. The hearing device of claim 15, wherein the one or more processors are configured to generate the side reference signal in accordance with a second microphone polar pattern by generating the side reference signal in accordance with a figure-of-eight microphone polar pattern, wherein at least one null of the figure-of-eight microphone polar pattern is directed to a spatial region adjacent the first side of the head of the recipient.

17. The hearing device of claim 15, wherein the one or more processors are configured to generate the side reference signal in accordance with a second microphone polar pattern by generating the side reference signal in accordance with a hypercardoid microphone polar pattern, wherein at least one null of the hypercardoid microphone polar pattern is directed to a spatial region adjacent the first side of the head of the recipient.

18. The hearing device of claim 15, wherein the one or more processors are configured to generate the side gain mask based on the primary reference signal and the side reference signal by generating the side gain mask to increase sensitivity to sound that does not bend around the head of the recipient.

19. The hearing device of claim 15, wherein the one or more processors are configured to generate the side gain mask based on the primary reference signal and the side reference signal by generating the side gain mask to increase sensitivity to sound frequencies at or above 1.3 kHz.

20. The hearing device of claim 15, wherein the one or more processors are configured to generate the primary reference signal in accordance with a first microphone polar pattern by generating the primary reference signal in accordance with a front-facing cardioid microphone polar pattern having maximum sensitivity to sounds received from a spatial region at a front of the head of the recipient.

* * * * *